United States Patent
Fukui et al.

(10) Patent No.: US 10,063,769 B2
(45) Date of Patent: Aug. 28, 2018

(54) ELECTRONIC APPARATUS

(71) Applicant: KYOCERA CORPORATION, Kyoto (JP)

(72) Inventors: Yujiro Fukui, Kawanishi (JP); Keisuke Nagata, Kobe (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/247,662

(22) Filed: Aug. 25, 2016

(65) Prior Publication Data
US 2017/0099430 A1    Apr. 6, 2017

(30) Foreign Application Priority Data
Oct. 2, 2015    (JP) .................... 2015-196597

(51) Int. Cl.
*H04N 5/232* (2006.01)
*H04N 5/247* (2006.01)
*H04N 5/225* (2006.01)

(52) U.S. Cl.
CPC ....... *H04N 5/23216* (2013.01); *H04N 5/2258* (2013.01); *H04N 5/23241* (2013.01); *H04N 5/23293* (2013.01); *H04N 5/23296* (2013.01); *H04N 5/247* (2013.01)

(58) Field of Classification Search
CPC ............. H04N 5/23296; H04N 5/2258; H04N 5/23216; H04N 5/2624; H04N 5/2628; G06T 2207/10016; G07F 17/3211
See application file for complete search history.

(56) References Cited

U.S. PATENT DOCUMENTS

| | | | | |
|---|---|---|---|---|
| 6,097,429 A * | 8/2000 | Seeley | ............. | G08B 13/19602 348/154 |
| 2007/0035623 A1* | 2/2007 | Garoutte | .......... | G08B 13/19608 348/143 |
| 2013/0050532 A1 | 2/2013 | Ueda et al. | | |
| 2014/0146172 A1* | 5/2014 | Kajitani | .................. | H04N 7/18 348/143 |
| 2014/0178027 A1* | 6/2014 | Lee | .................. | H04N 21/41407 386/201 |
| 2014/0293079 A1* | 10/2014 | Milanfar | ............. | H04N 5/2171 348/222.1 |

FOREIGN PATENT DOCUMENTS

| | | |
|---|---|---|
| JP | 2005-101874 | 4/2005 |
| JP | 2013-46292 A | 3/2013 |
| JP | 2014-122957 A | 7/2014 |

OTHER PUBLICATIONS

Official Action dated Apr. 25, 2017 in counterpart Japanese Patent Application No. 2015-196597 with Statement of relevance of non-English References.

* cited by examiner

*Primary Examiner* — Trung Diep
(74) *Attorney, Agent, or Firm* — Duane Morris LLP

(57) ABSTRACT

An electronic apparatus is disclosed. The electronic apparatus comprises a first camera and a second camera. The second camera takes a still image while the first camera takes a video.

12 Claims, 15 Drawing Sheets

F I G. 3
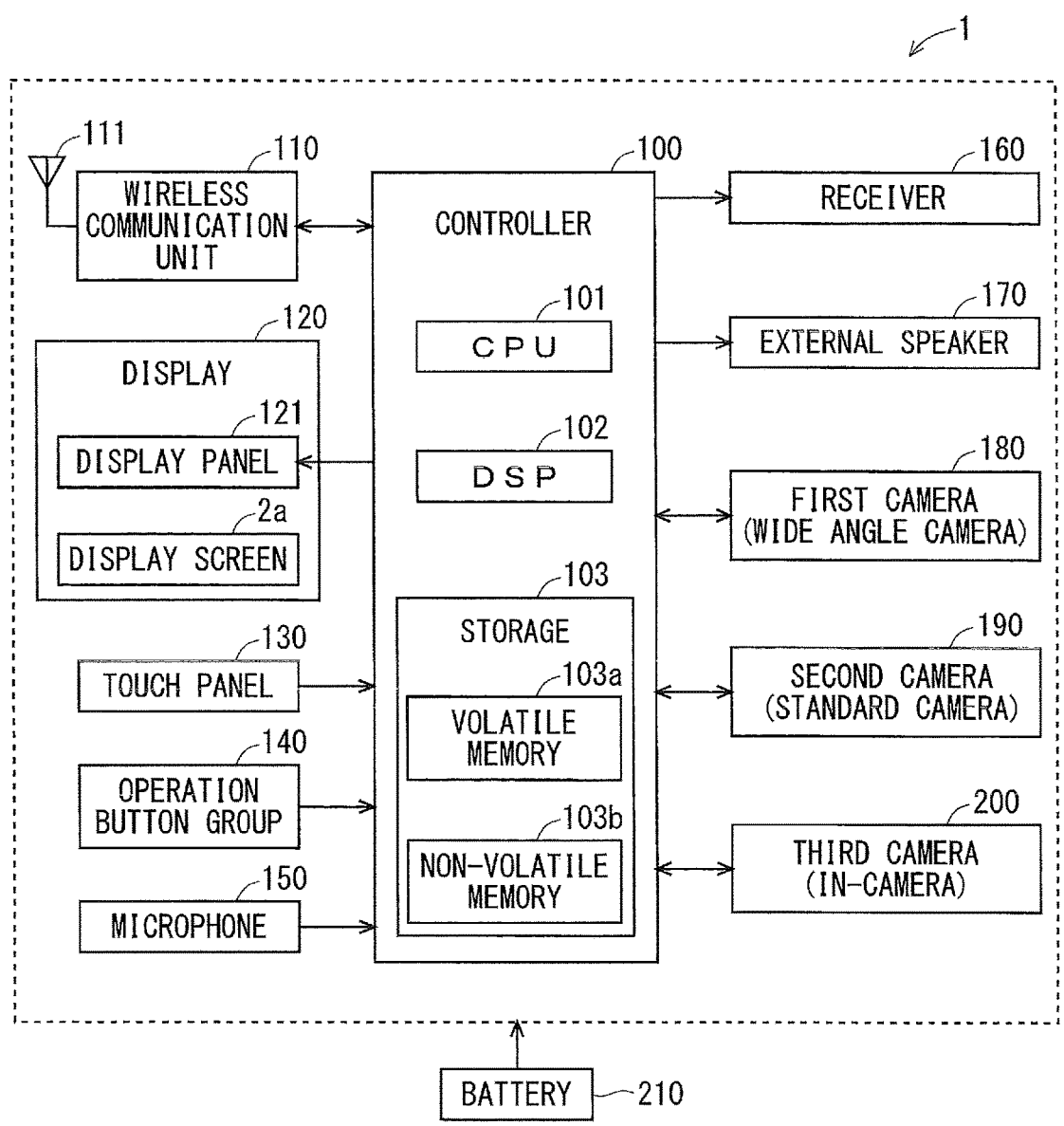

F I G. 4
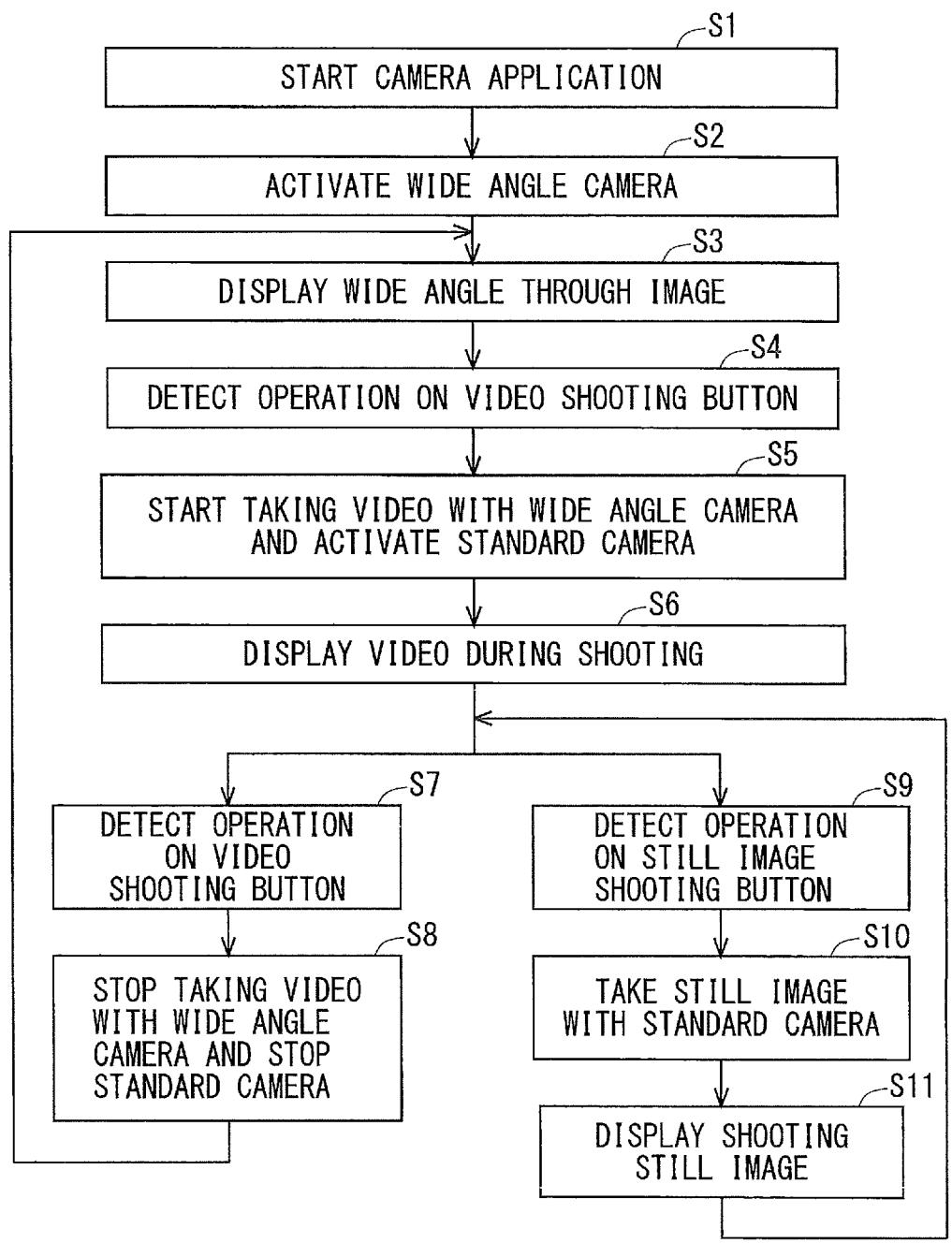

F I G. 1 7
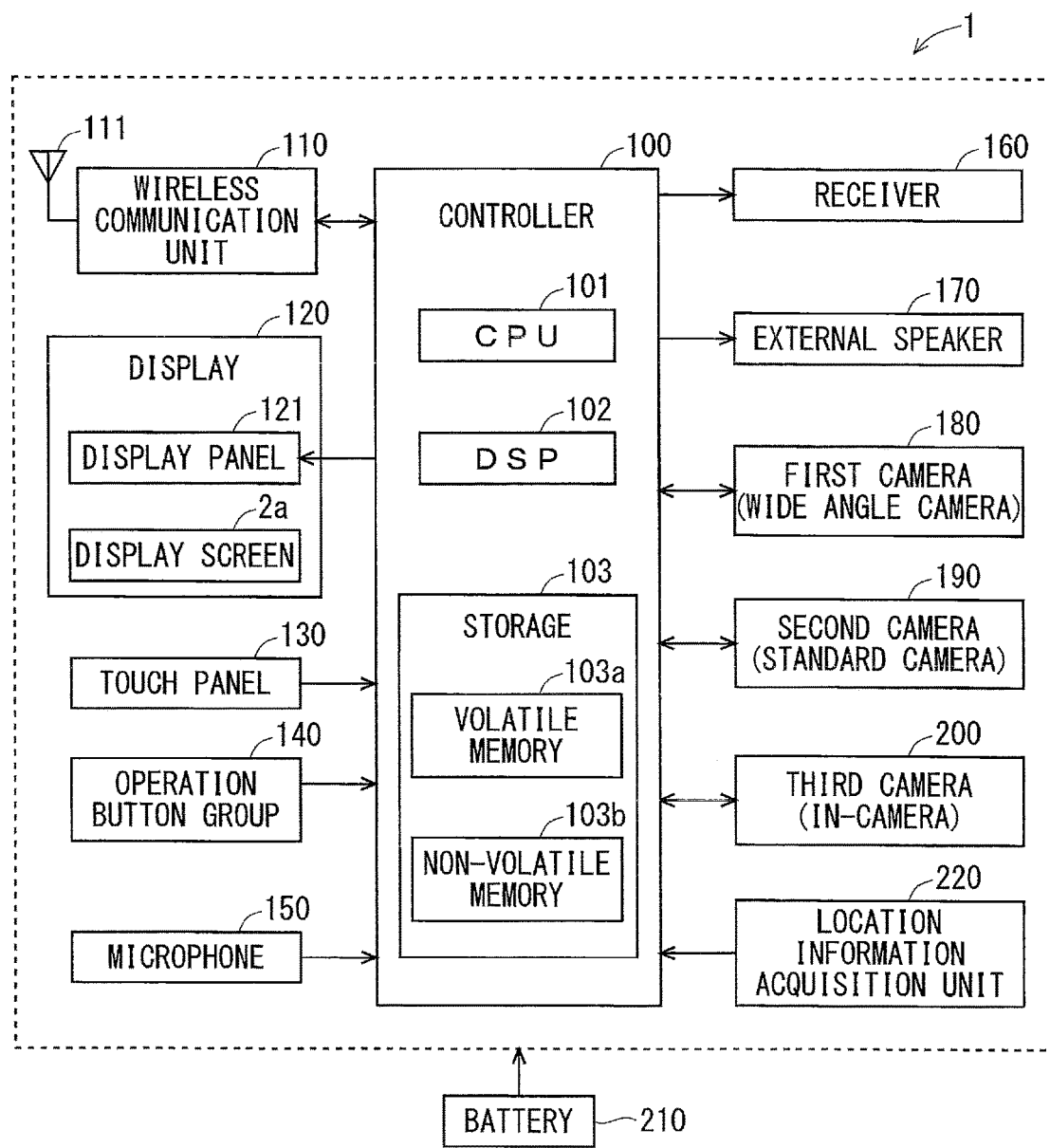

ELECTRONIC APPARATUS

CROSS-REFERENCE TO RELATED APPLICATION

The present application claims priority under 35 U.S.C. § 119 to Japanese Patent Application No. 2015-196597, filed on Oct. 2, 2015, entitled "ELECTRONIC APPARATUS". The content of which is incorporated by reference herein in its entirety.

FIELD

Embodiments of the present disclosure relate to an electronic apparatus.

BACKGROUND

Conventionally, various techniques are suggested regarding electronic apparatuses having a camera.

SUMMARY

An electronic apparatus is disclosed. In one embodiment, an electronic apparatus comprises a first camera and a second camera. The second camera takes a still image while the first camera takes a video.

BRIEF DESCRIPTION OF THE DRAWINGS

FIG. 3 illustrates an example of an electrical configuration of the electronic apparatus.

FIG. 4 illustrates a flow chart showing an example of an operation of the electronic apparatus.

FIG. 17 illustrates an example of an electrical configuration of the electronic apparatus.

DETAILED DESCRIPTION

External Appearance of Electronic Apparatus

Figure 1:
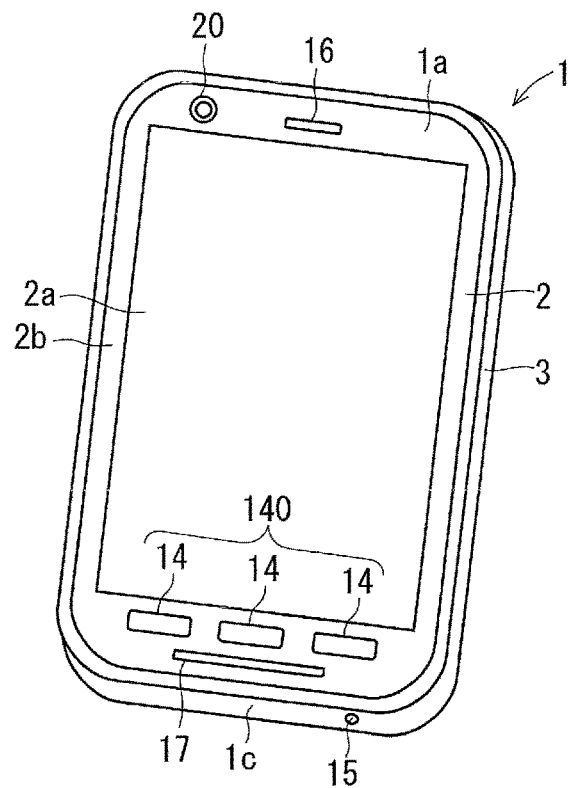
FIG. 1 illustrates a perspective view showing an external appearance of an electronic apparatus.
Figure 2:
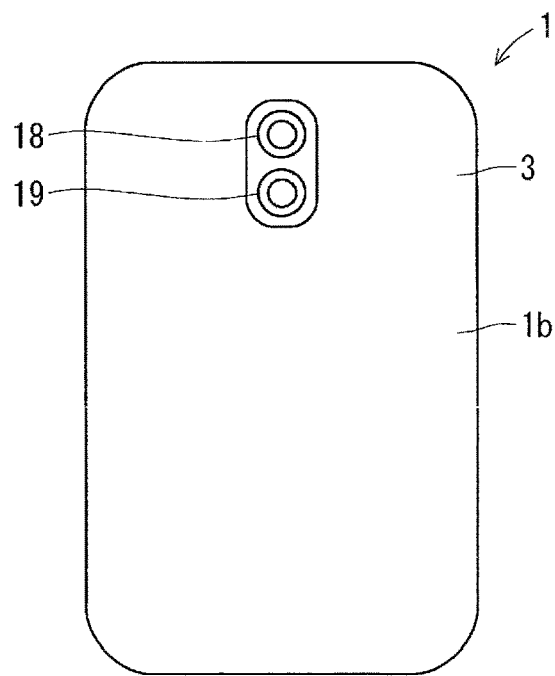
FIG. 2 illustrates a back view showing an external appearance of the electronic apparatus.

FIG. 1 and FIG. 2 illustrate a perspective view and a back view schematically showing an example of an external appearance of an electronic apparatus 1, respectively. The electronic apparatus 1 is a mobile phone such as a smartphone, for example.

As shown in FIG. 1 and FIG. 2, the electronic apparatus 1 includes a cover panel 2 located in a front surface 1a of the electronic apparatus 1 and an apparatus case 3 to which the cover panel 2 is attached. The cover panel 2 and the apparatus case 3 constitute an outer package of the electronic apparatus 1. The electronic apparatus 1 has a plate shape substantially rectangular in a plan view, for example.

The cover panel 2 is provided with a display screen (also referred to as a display region) 2a on which various types of information such as characters, symbols, and diagrams displayed by a display panel 121, which will be described below, are displayed. The display screen 2a has, for example, a rectangular shape in a plan view. A peripheral part 2b that surrounds the display screen 2a in the cover panel 2 is mostly black through, for example, application of a film. Accordingly, the peripheral part 2b of the cover panel 2 mostly serves as a non-display region on which the various type of information, which are displayed by the display panel 121, are not displayed.

Attached to a rear surface of the display screen 2a is a touch panel 130, which will be described below. Attached to a surface opposite to a surface of the display screen 2a side in the touch panel 130 is the display panel 121. That is to say, attached to the rear surface of the display screen 2a via the touch panel 130 is the display panel 121. Accordingly, the user can provide various instructions to the electronic apparatus 1 by operating the display screen 2a with an operator such as his/her finger.

As shown in FIG. 1, attached to an upper-side end portion of the cover panel 2 is a third lens transparent part 20 which enables a lens of a third camera 200, which will be described below, to be visually recognized from outside of the electronic apparatus 1. Attached to the upper-side end portion of the cover panel 2 is a receiver hole 16. Attached to a lower-side end portion of the cover panel 2 is a speaker hole 17. Provided in a bottom surface 1c of the electronic apparatus 1, that is to say, in a bottom surface (a lower side surface) of the apparatus case 3 is a microphone hole 15.

As shown in FIG. 2, provided in a back surface 1b of the electronic apparatus 1, that is to say, in an upper-side end portion of a back surface of the apparatus case 3 is a first lens transparent part 18 which enables a lens of a first camera 180, which will be described below, to be visually recognized from the outside of the electronic apparatus 1. Provided in the upper-side end portion of the back surface of the apparatus case 3 is a second lens transparent part 19 which enables a lens of a second camera 190, which will be described below, to be visually recognized from the outside of the electronic apparatus 1. The first lens transparent part 18 and the second lens transparent part 19 are provided in the back surface of the apparatus case 3 side by side along a longitudinal direction of the apparatus case 3.

Provided inside the apparatus case 3 is an operation button group 140 including a plurality of operation buttons 14. Each operation button 14 is a hardware button such as a press button, and its surface is exposed from a lower-side end portion of the cover panel 2. The user can provide various instructions to the electronic apparatus 1 by operating each operation button 14. The plurality of operation buttons 14 include, for example, a home button, a back button, and a history button.

The home button is an operation button to cause the display screen 2a to display a home screen. The back button is an operation button to switch a display of the display screen 2a to a preceding one. The history button is an operation button to cause the display screen 2a to display a history of an application performed by the electronic apparatus 1.

<Electrical Configuration of Electronic Apparatus>

FIG. 3 is a block diagram illustrating an example of an electrical configuration of the electronic apparatus 1. As illustrated in FIG. 3, the electronic apparatus 1 includes a controller 100, a wireless communication unit 110, a display 120, the touch panel 130, the operation button group 140, and a microphone 150. The electronic apparatus 1 further includes a receiver 160, an external speaker 170, the first camera 180, the second camera 190, the third camera 200, and a battery 210. The apparatus case 3 houses each of these components provided in the electronic apparatus 1.

The controller 100 controls other components of the electronic apparatus 1 to collectively manage the operation of the electronic apparatus 1. The controller 100 includes at least one processor for providing control and processing capability to perform various functions as described in detail below. In accordance with various embodiments, the at least one processor may be implemented as a single integrated circuit (IC) or as multiple communicatively coupled IC's and/or discrete circuits. It is appreciated that the at least one processor can be implemented in accordance with various known technologies.

In one embodiment, the processor includes one or more circuits or units configurable to perform one or more data computing procedures or processes. For example, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In the present example, the controller 100 includes a CPU (Central Processing Unit) 101, a DSP (Digital Signal Processor) 102, and a storage 103, for example.

The storage 103 includes a non-transitory recording medium readable by the CPU 101 and the DSP 102 such as a volatile memory 103a and a non-volatile memory 103b. The volatile memory 103a is, for example, a DRAM (Dynamic Random Access Memory). The non-volatile memory 103b is, for example, a flash ROM (a flash memory). The storage 103 mainly stores a main program to control the electronic apparatus 1 and a plurality of application programs (simply referred to as "the application" hereinafter, in some cases). The CPU 101 and the DSP 102 perform the various programs in the storage 103 to achieve various functions of the controller 100. The storage 103 stores, for example, a call application to perform a voice call and a video call and a camera application to take a still image or a video using the first camera 180, the second camera 190, or the third camera 200.

The storage 103 may include a non-transitory computer-readable recording medium other than the volatile memory 103a and the non-volatile memory 103b. The storage 103 may include, for example, a compact hard disk drive and a SSD (Solid State Drive). All functions or a part of the functions of the controller 100 may be achieved by a hardware which does not need a software to achieve the function of the hardware.

The wireless communication unit 110 has an antenna 111. The wireless communication unit 110 can receive, through the antenna 111, a signal from a mobile phone different from the electronic apparatus 1 or a signal from a communication device such as a web server connected to Internet, for example, via a base station. The wireless communication unit 110 can perform amplification processing and down-conversion processing on the signal received by the antenna 111 and then outputs a resultant signal to the controller 100. The controller 100 can perform modulation processing, for example, on the received signal that has been input, to thereby obtain information such as a sound signal indicative of voice or music contained in the received signal.

The wireless communication unit 110 can also perform up-conversion processing and amplification processing on a transmission signal that has been generated by the controller 100, to thereby wirelessly transmit the processed transmission signal from the antenna 111. The transmission signal from the antenna 111 is received, via the base station, by a mobile phone different from the electronic apparatus 1 or a communication device such as the web server connected to the Internet.

The display 120 includes the display panel 121 and the display screen 2a. The display panel 121 is, for example, a liquid crystal display panel or an organic EL panel.

The display panel 121 can display various types of information such as characters, symbols, and graphics under control of the controller 100. The various type of information, which the display panel 121 displays, is displayed on the display screen 2a.

The touch panel 130 is, for example, a projected capacitive type touch panel. The touch panel 130 can detect an operation performed by the operator such as the finger on the display screen 2a. The touch panel 130 serves as an operation detector to detect an operation on the display screen 2a. When the user operates the display screen 2a with the operator such as his/her finger, an electrical signal corresponding to the operation is input from the touch panel 130 to the controller 100. Accordingly, the controller 100 can specify contents of the operation performed on the display screen 2a based on the electrical signal input from the touch panel 130, thereby performing a processing in accordance with the contents. The user can also provide the various instruction to the electronic apparatus 1 by operating the display screen 2a with a pen for the touch panel such as a stylus pen, for example, instead of the operator such as his/her finger.

When the user operates each operation button 14 of the operation button group 140, the operation button 14 can output to the controller 100 an operation signal indicating that the operation button 14 has been operated. Accordingly, the controller 100 can determine, based on the operation signal output from each operation button 14, whether the operation button 14 has been operated. The controller 100 can perform the processing corresponding to the operation button 14 that has been operated. Each operation button 14 may also be a software button displayed on the display screen 2a instead of a hardware button such as a push button. In this case, the touch panel 130 detects the operation performed on the software button, so that the controller 100 can perform the processing corresponding to the software button that has been operated.

The microphone 150 can convert the sound input from the outside of the electronic apparatus 1 into an electrical sound signal and then output the electrical sound signal to the controller 100. The sound from the outside of the electronic apparatus 1 is taken inside the electronic apparatus 1 through the microphone hole 15 provided in the bottom surface (a lower side surface) of the apparatus case 3, for example, to be input to the microphone 150.

The external speaker 170 is, for example, a dynamic speaker. The external speaker 170 can convert an electrical sound signal from the controller 100 into sound and then output the sound. The sound output from the external speaker 170 is output to the outside through the speaker hole 17 provided in the lower-side end portion of the cover panel 2, for example. The sound output through the speaker hole 17 is set to a volume large enough to be heard in the place apart from the electronic apparatus 1.

The receiver 160 is made up of, for example, a dynamic speaker. The receiver 160 can convert an electrical sound signal from the controller 100 into sound and then output the sound. The receiver 160 can output the received sound, for example. The sound output from the receiver 160 is output to the outside through the receiver hole 16 provided in the upper-side end portion of the cover panel 2, for example. The volume of the sound output through the receiver hole 16 is set to be smaller than the volume of the sound output from the external speaker 170 through the speaker hole 17.

A piezoelectric vibration element may be provided instead of the receiver 160. The piezoelectric vibration element can vibrate based on the sound signal from the controller 100. The piezoelectric vibration element is provided in a rear surface of the cover panel 2, for example, and its vibration based on the sound signal enables the cover panel 2 to vibrate. When the user brings the cover panel 2 close to his/her ear, the vibration of the cover panel 2 is transmitted to the user as the sound. The receiver hole 16 is not necessary when the piezoelectric vibration element is provided instead of the receiver 160.

The battery 210 can output a power source of the electronic apparatus 1. The battery 210 is, for example, a rechargeable battery such as a lithium-ion secondary battery. The battery 210 can supply the power source to various electronic components such as the controller 100 and the wireless communication unit 110 included in the electronic apparatus 1.

Each of the first camera 180, the second camera 190, and the third camera 200 comprises a lens, an image sensor, and so on. Each of the first camera 180, the second camera 190, and the third camera 200 can take an image of an object under control of the controller 100, generate a still image or a video of the object, and then output the still image or the video to the controller 100. The controller 100 can store the still image or the video that has been input in the non-volatile memory 103b of the storage 103.

The lens of the third camera 200 can be visually recognized from the third lens transparent part 20 provided in the cover panel 2. Accordingly, the third camera 200 can take an image of an object located on a cover panel 2 side of the electronic apparatus 1, that is to say, a front surface 1a side of the electronic apparatus 1. Such a third camera 200 is referred to as an "in-camera" in some cases. Hereinafter, the third camera 200 is referred to as "the in-camera 200" in some cases.

The lens of the first camera 180 can be visually recognized from the first lens transparent part 18 provided in the back surface 1b of the electronic apparatus 1. The lens of the second camera 190 can be visually recognized from the second lens transparent part 19 provided in the back surface 1b of the electronic apparatus 1. Accordingly, the first camera 180 and the second camera 190 can take an image of an object located on a back surface 1b side of the electronic applause 1. Each of such a first camera 180 and second camera 190 is referred to as an "out-camera" in some cases.

The first camera 180 is a camera which can take an image at a wider angle than the second camera 190. Herein, when the lenses of the first camera 180 and second camera 190 are both single focus lenses with fixed field angles, "the camera which can take the image at the wider angle" indicates that the fixed field angle of the first camera 180 is larger than that of the second camera 190. When the lens of the first camera 180 is a single focus lens and the lens of the second camera 190 is a zoom lens with a variable field angle, "the camera which can take the image at the wider angle" indicates that the fixed field angle of the first camera 180 is larger than a maximum value of the variable field angle of the second camera 190. When the lens of the first camera 180 is a zoom lens and the lens of the second camera 190 is a single focus lens, "the camera which can take the image at the wider angle" indicates that a maximum value of a variable field angle of the first camera 180 is larger than the fixed field angle of the second camera 190. When the lenses of the first camera 180 and second camera 190 are both zoom lenses, "the camera which can take the image at the wider angle" indicates that a maximum value of a variable field angle of the first camera 180 is larger than a maximum value of a variable field angle of the second camera 190.

The first camera 180 is referred to as "the wide angle camera 180" and the second camera 190 is referred to as "the standard camera 190" hereinafter for convenience of description. When there is no need of distinguishing the first camera 180, the second camera 190, and the in-camera 200, each camera is simply referred to as "the camera." In the present example, the lens of each camera is the single focus lens. At least one of the wide angle camera 180, the standard camera 190, and the in-camera 200 may be the zoom lens.

The electronic apparatus 1 has a zoom function for each camera. That is to say, the electronic apparatus 1 has a wide camera zoom function for zooming a shooting range of the wide camera 180 (referred to as "the wide angle shooting range" hereinafter), a standard camera zoom function for zooming a shooting range of the standard camera 190 (referred to as "the standard shooting range" hereinafter), and an in-camera zoom function for zooming an object whose image is taken with the in-camera 200. When a zoom magnification of each of the wide angle camera 180 and standard camera 190 is "one", the wide angle shooting range is wider than the standard shooting range and includes the standard shooting range.

Since the lens of each camera in the present example is the single focus lens, each of the wide camera zoom function, standard camera zoom function, and in-camera zoom function is a digital zoom function. At least one of the wide camera zoom function, standard camera zoom function, and in-camera zoom function may be an optical zoom function achieved by the zoom lens.

In the present example, a total number of pixels of the image sensor of the standard camera 190 is larger than that of the wide angle camera 180, and a total number of pixels of the image sensor of the in-camera 200 is smaller than that of the wide angle camera 180.

The user can operate the display screen 2a and set a total number of pixels of the still image taken with each camera. Accordingly, a file size of the still image stored in the non-volatile memory 103b can be adjusted.

A maximum setting value of the number of pixels of the still image taken with the wide angle camera 180 is smaller than that of the still image taken with the standard camera 190. A total number of pixels of the video taken with the standard camera 190 is identical with that of the video taken with the wide angle camera 180 and is, for example, fixed. In each of the wide angle camera 180 and standard camera 190, the number of pixels (fixed) of the taken video is smaller than the maximum setting value of the number of pixels of the taken still image. Accordingly, the number of pixels of the video taken with the wide angle camera 180 is smaller than the maximum setting value of the number of pixels of the still image taken with the standard camera 190.

<Operation of Electronic Apparatus when Camera Application is Executed>

FIG. 4 illustrates a flow chart showing an example of an operation of the electronic apparatus 1 when a camera application is executed. When a predetermined operation is performed on the display screen 2a, the controller 100 starts, in a step S1, an execution of the camera application stored in the storage 103, as shown in FIG. 4.

In an initial state where the controller 100 has not yet executed various applications, displayed on the display screen 2a is a home screen, for example. Displayed in the home screen are a plurality of icons to execute the various application. When the touch panel 130 detects an operation on an icon for executing the camera application displayed on the display screen 2a, the controller 100 starts the execution of the camera application stored in the storage 103.

The operation on the icon displayed on the display screen 2a may include, for example, an operation of the user taking the operator such as his/her finger off the icon after bringing the operator into contact with or close to the icon. The above operation is referred to as a so-called tap operation. The tap operation is used as an operation on various information such as a software button displayed on the display screen 2a as well as the operation on the icon to execute the application.

When the camera application is not executed, the operations of the wide angle camera 180, standard camera 190, and in-camera 200 stop. That is to say, the power source is not supplied to the wide angle camera 180, the standard camera 190, and the in-camera 200. When the controller 100 starts the execution of the camera application, the controller 100 supplies the power source only to the wide angle camera 180 out of the wide angle camera 180, standard camera 190, and in-camera 200, thereby activating the wide angle camera 180 in a step S2. The activation of the camera indicates that the power supply to the camera is started. The controller 100 controls the power supply to the wide angle camera 180, the standard camera 190, and the in-camera 200.

When the wide angle camera 180 is activated in the step S2, the controller 100 causes the display panel 121 to display a through image (also referred to as a live view image, a preview image, or simply a preview) taken with the wide angle camera 180 in a step S3. That is to say, the display screen 2a displays the images which are sequentially taken with the wide angle camera 180 at a predetermined frame rate in real time. The through image is an image which enables the user to confirm an object taken with the camera in a shooting range in real time. The through image is temporarily stored in the volatile memory 103a in the storage 103 by the controller 100 and then displayed on the display screen 2a. Although the through image is also a type of the video, the video taken with the camera is not the through image herein but indicates a video stored in the non-volatile memory 103b. Hereinafter, the through image taken with the wide angle camera 180 is referred to as "the wide angle through image" in some cases. The through image taken with the standard camera 190 is referred to as "the standard through image" in some cases.

Figure 5:
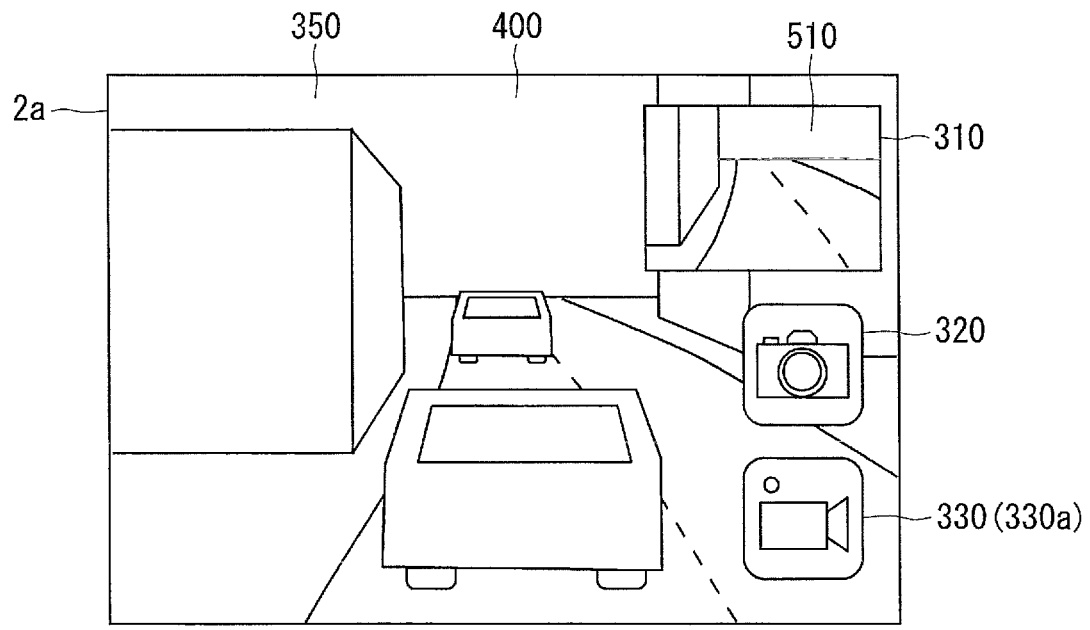
FIG. 5 illustrates an example of a display of a display screen.

FIG. 5 illustrates an example of a display of the display screen 2a which displays a wide angle through image 400. In the following description, a longitudinal direction and a short-side direction of the display screen 2a are defined as a horizontal direction and a vertical direction, respectively, for convenience of description.

As shown in FIG. 5, an upper right portion of the display screen 2a displays a subscreen 310. A right-side end portion of the display screen 2a displays a still image shooting button 320 and a video shooting button 330, which are software buttons. A partial region 350 (also referred to as "the main screen 350" hereinafter, in some cases) except a region, in the display screen 2a, in which the subscreen 310 and the software buttons are displayed, displays the wide angle through image 400. That is to say, the main screen 350 displays an object, which is sequentially taken with the wide angle camera 180, in the wide angle shooting range.

The subscreen 310 displays a still image 510 (also referred to as "shooting still image 510" hereinafter, in some cases) which is taken with the standard camera 190 to be stored in the storage 103. The subscreen 310 displays the shooting still image 510 of a latest shooting date and time in a plurality of shooting still images 510 stored in the storage 103. When no shooting still image 510 is stored in the storage 103, the subscreen 310 is shown in black, for example.

As described above, the main screen 350 displays the wide angle through image 400 and the subscreen 310 displays the shooting still image 510, so that the user can confirm the wide angle through image 400 and the shooting still image 510 at the same time. Since the wide angle through image 400 is displayed in larger size than the shooting still image 510, the user can easily confirm the wide angle through image 400.

The still image shooting button 320 is a button to take a still image. When the touch panel 130 detects a predetermined operation (for example, the tap operation) on the still image shooting button 320 in a state where the standard camera 190 is activated, the controller 100 stores the still image, which is taken with the standard camera 190 according to the operation on the still image shooting button 320, in the non-volatile memory 103b in the storage 103.

In contrast, when the touch panel 130 detects a predetermined operation (for example, the tap operation) on the still image shooting button 320 in a state where the standard camera 190 is not activated and the wide angle camera 180 does not take a video, the controller 100 stores the still image, which is taken with the wide angle camera 180 according to the operation on the still image shooting button 320, in the non-volatile memory 103b in the storage 103.

The video shooting button 330 is a button to start and stop taking the video with the wide angle camera 180. When the touch panel 130 detects a predetermined operation (for example, the tap operation) on the video shooting button 330, the controller 100 starts storing the video, which is taken with the wide angle camera 180, in the non-volatile memory 103b. Subsequently, when the touch panel 130 detects a predetermined operation on the video shooting button 330, the controller 100 stops storing the video, which is taken with the wide angle camera 180, in the non-volatile memory 103b.

When the touch panel 130 detects the operation on the video shooting button 330 in a step S4 after the step S3 shown in FIG. 4, the controller 100 starts taking the video with the wide angle camera 180 in a step S5. Specifically, the controller 100 starts storing the video, which is taken with the wide angle camera 180, in the non-volatile memory 103b. The controller 100 also supplies the power source to the standard camera 190 to activate the standard camera 190 in the step S5.

When the wide angle camera 180 starts taking the video in the step S5, the controller 100 causes the display panel 121 to display the video, which is being taken with the wide angle camera 180, (also referred to as "the video during shooting" hereinafter, in some cases) in a step S6.

Figure 6:
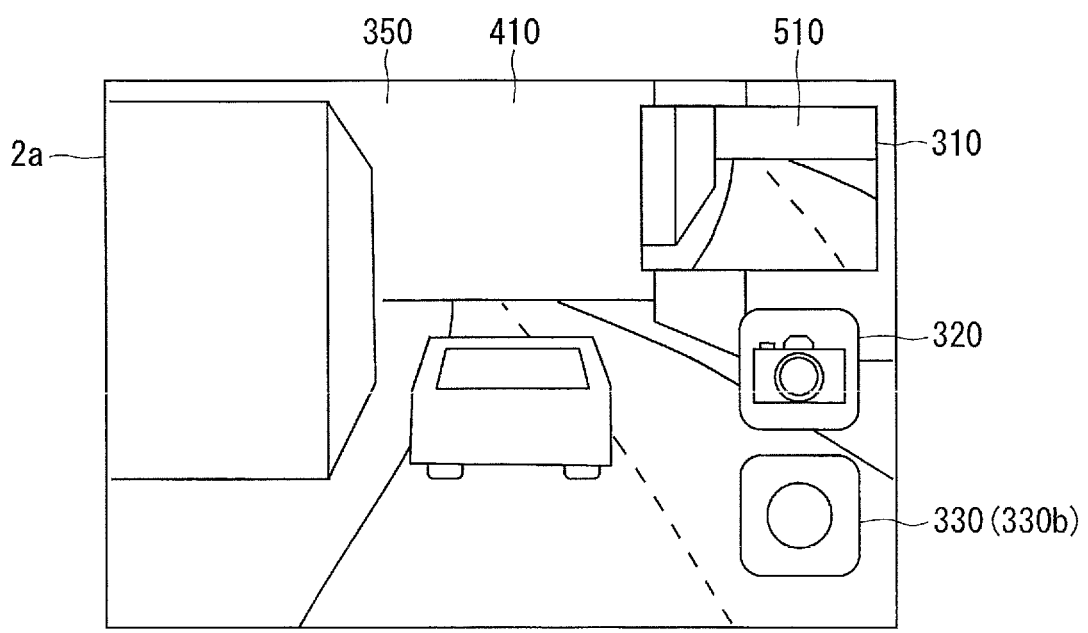
FIG. 6 illustrates an example of a display of the display screen.

FIG. 6 illustrates an example of the display screen 2a which displays the video during shooting 410. As shown in FIG. 6, the main screen 350 displays the video during shooting 410 instead of the wide angle through image 400 shown in FIG. 5. As shown in in FIG. 6, a video shooting button 330b in a state where the wide angle camera 180 is taking the video is differently displayed from a video shooting button 330a, shown in FIG. 5, in a state where the wide angle camera 180 is not taking the video. Accordingly, the user can confirm whether or not the video is taken with the wide angle camera 180 upon seeing the video shooting button 330.

The main screen 350 displays the video during shooting 410 and the subscreen 310 displays the shooting still image 510, so that the user can confirm the video during shooting 410 and the shooting still image 510 at the same time. Since the video during shooting 410 is displayed in larger size than the shooting still image 510, the user can easily confirm the video during shooting 410.

When the touch panel 130 detects the operation on the video shooting button 330 while the wide angle camera 180 takes the video in a step S7, the controller 100 stops taking the video with the wide angle camera 180 in a step S8. Specifically, the controller 100 stops storing the video, which is taken with the wide angle camera 180, in the non-volatile memory 103b. The controller 100 also stops supplying the power source to the standard camera 190 to stop the standard camera 190 in the step S8.

The step S3 is executed again after the step S8. In the step S3 executed after the step S8, the controller 100 causes the main screen 350 to display the wide angle through image 400 instead of the video during shooting 410. At this time, the display screen 2a displays the screen as shown in FIG. 5. The electronic apparatus 1 operates in a manner similar to the above hereinafter.

In the meanwhile, when the touch panel 130 detects the operation on the still image shooting button 320 while the wide angle camera 180 takes the video in a step S9, the standard camera 190 takes the still image in a step S10. Specifically, the controller 100 stores the still image, which is taken with the standard camera 190 when the still image shooting button 320 is operated, in the non-volatile memory 103b in the storage 103. In a step S11, the controller 100 controls the display panel 121 to cause the subscreen 310 to display the shooting still image 510 taken in the step S10.

As described above, when the standard camera 190 takes the still image while the wide angle camera 180 takes the video, the display screen 2a displays the still image and the video during shooting 410. Accordingly, the user can confirm both the video which is being taken with the wide angle camera 180 and the still image taken with the standard camera 190 at the same time.

After the step S11, the controller 100 enters the state after the execution of the step S6, that is to say, the state of waiting for the operation on the still image shooting button 320 and the video shooting button 330. The electronic apparatus 1 operates in a manner similar to the above hereinafter.

As described above, in the electronic apparatus 1, the standard camera 190 takes the still image while the wide angle camera 180 takes the video. That is to say, the camera, which is different from that being taking the video, takes the still image. Accordingly, freedom in generating the still image is enhanced. It is possible to generate the still image from the video taken with the wide angle camera 180, and in this case, the number of pixel and field angle of the still image is identical with those of the video. In the electronic apparatus 1, the camera, which is different from that being taking the video, takes the still image, so that the still image having the number of pixel different from that of the video can be obtained. The still image having the field angle different from that of the video can be obtained.

The main screen 350 displays the video during shooting 410 and the subscreen 310 displays the shooting still image 510, so that the user can confirm the video during shooting 410 and the shooting still image 510 at the same time. Since the video during shooting 410 is displayed in larger size than the shooting still image 510, the user can easily confirm the video during shooting 410.

<Enlarged Display of Shooting Still Image>

When the touch panel 130 detects a predetermined operation (for example, the tap operation) on the shooting still image 510 in the state where the subscreen 310 displays the shooting still image 510, the controller 100 causes the display panel 121 to enlarge and display the shooting still image 510.

Figure 7:
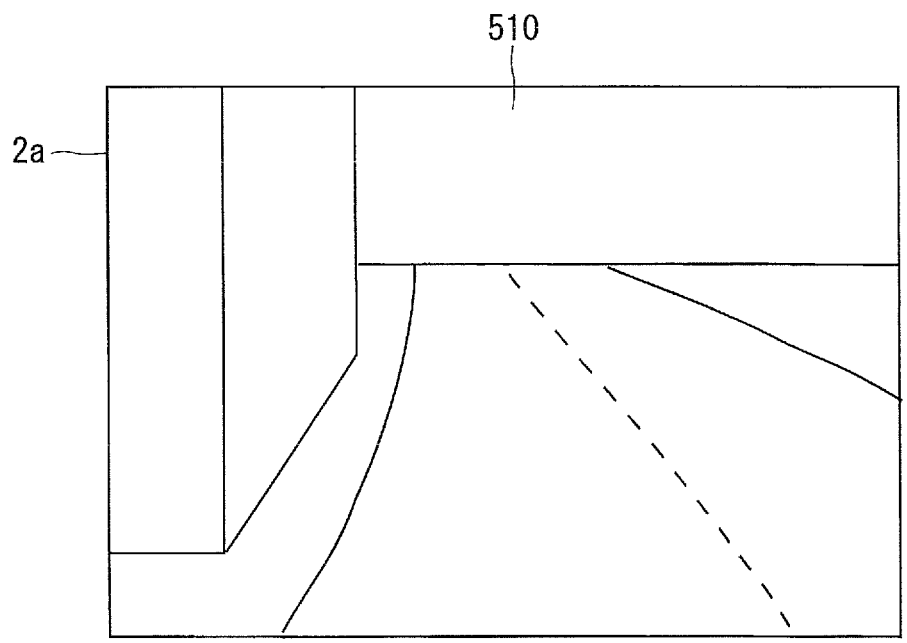
FIG. 7 illustrates an example of a display of the display screen.

FIG. 7 illustrates an example of a display of the display screen 2a which enlarges and displays the shooting still image 510. In the example of FIG. 7, the shooting still image 510 is enlarged to the same size as display screen 2a to be displayed. The display screen 2a does not display the subscreen 310, the still image shooting button 320, and the video shooting button 330.

As shown in FIG. 7, when the controller 100 detects a predetermined operation, that is, for example, an operation on the operation button 14 which is a back button, in the state where the shooting still image 510 is enlarged and displayed, the controller 100 returns the display of the display screen 2a to the state before the shooting still image 510 is enlarged and displayed.

Such an operation of enlarging and displaying the shooting still image 510 may be performed when the main screen 350 displays the wide angle through image 400 or the video during shooting 410.

As described above, the enlarged display of the shooting still image 510 enables the user to easily confirm the shooting still image 510.

In the present example, the standard camera 190 is activated only when the wide angle camera 180 takes the video. Accordingly, a power consumption of the electronic apparatus 1 can be suppressed compared to a case where the standard camera 190 is always activated. The standard camera 190 may be activated even when the wide angle camera 180 does not take the video. For example, the standard camera 190 may be activated simultaneously with the activation of the wide angle camera 180.

The electronic apparatus 1 may have, as an operation mode, a shooting allowed mode, in which the standard camera 190 can take the still image while the wide angle camera 180 takes the video, and a no shooting allowed mode, in which the standard camera 190 does not take the still image while the wide angle camera 180 takes the video. The user can instruct the electronic apparatus 1 whether to operate in the shooting allowed mode or the no shooting allowed mode by operating the display screen 2a.

When the operation mode of the electronic apparatus 1 is set to the shooting allowed mode, the still image shooting button 320 is displayed while the wide angle camera 180 takes the video, as shown in FIG. 6 described above. In the meanwhile, when the operation mode of the electronic apparatus 1 is set to the no shooting allowed mode, the still image shooting button 320 is not displayed while the wide angle camera 180 takes the video. When the operation mode of the electronic apparatus 1 is set to the no shooting allowed mode, the controller 100 may stop supplying the power source to the standard camera 190 to stop the operation of the standard camera 190. Accordingly, the power consumption of the electronic apparatus 1 can be suppressed.

When the operation mode of the electronic apparatus 1 is set to the no shooting allowed mode, the still image shooting button 320 may be displayed while the wide angle camera 180 takes the video. In this case, when the still image shooting button 320 is operated while the wide angle camera 180 takes the video, the controller 100 generates the still image from the video which is being taken with the wide angle camera 180 at a time of operating the still image shooting button 320, thereby storing the still image in the non-volatile memory 103b in the storage 103. Accordingly, the still image can be generated from the video which is being taken with the wide angle camera 180.

Figure 8:
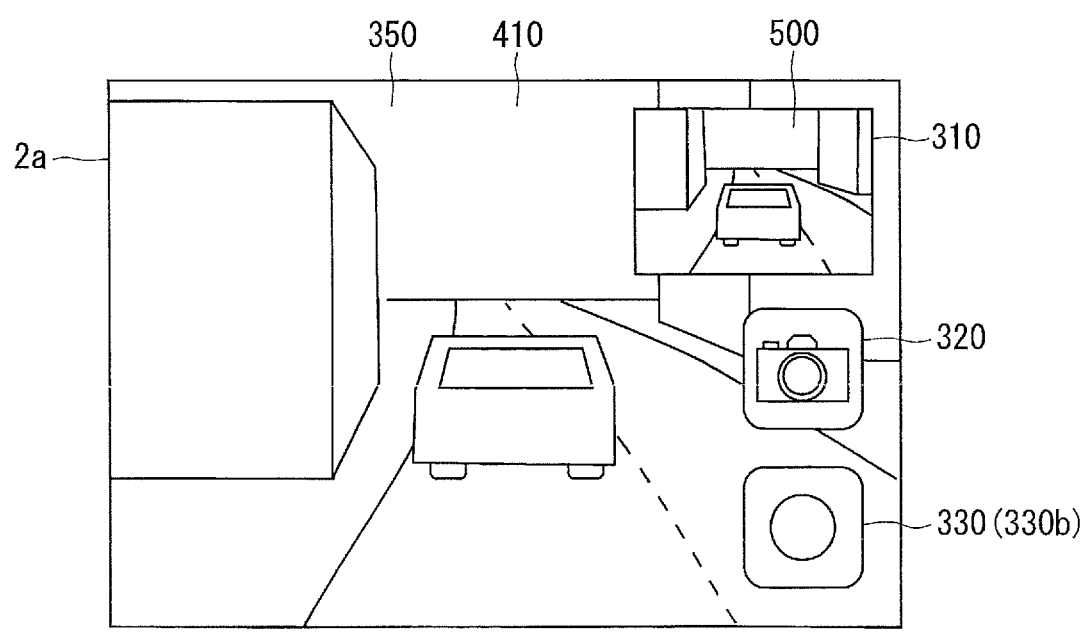
FIG. 8 illustrates an example of a display of the display screen.

As shown in FIG. 8, the subscreen 310 may display a standard through image 500 instead of the shooting still image 510 regardless of whether the wide angle camera 180 is taking the video or not. FIG. 8 illustrates a state where the subscreen 310 displays the standard through image 500 when the wide angle camera 180 does not take the video. When the still image shooting button 320 is operated in the state where the subscreen 310 displays the standard through image 500, the subscreen 310 temporarily displays the shooting still image 510 taken with the standard camera 190 as shown in FIGS. 5 and 6, and subsequently displays the standard through image 500.

Various Modification Examples

Various modification examples of the electronic apparatus 1 are described hereinafter.

First Modification Example: Display of Standard Through Image on Main Screen

Figure 9:
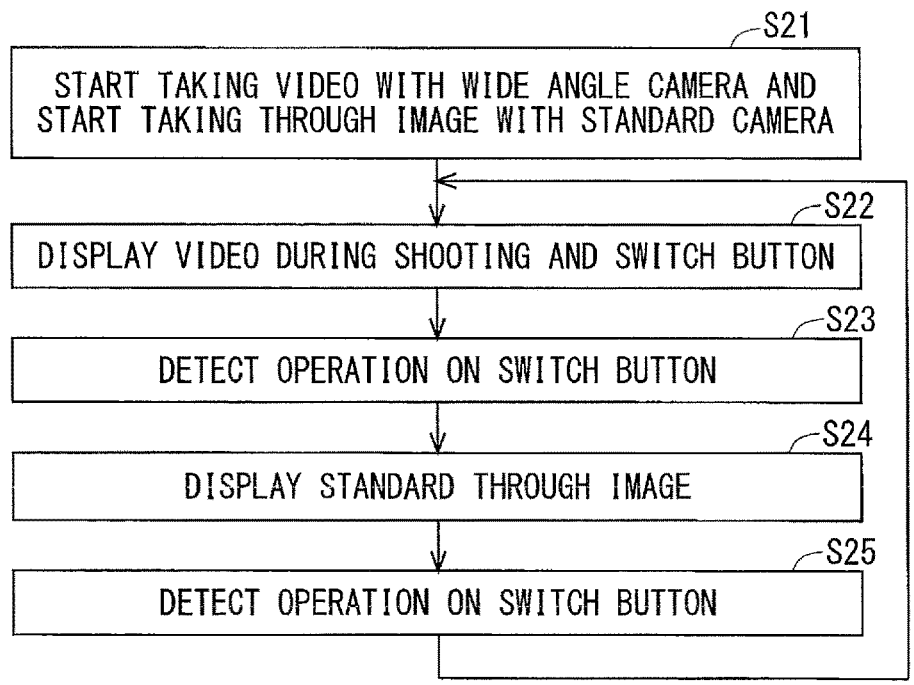
FIG. 9 illustrates a flow chart showing an example of an operation of the electronic apparatus.

In the present modification example, the user can cause the main screen 350 to display the standard through image 500. FIG. 9 is a flow chart showing an example of an operation of the electronic apparatus 1 according to the present modification example.

When the video shooting button 330 is operated during the execution of the camera application, the controller 100 starts taking the video with the wide angle camera 180 in a step S21. The controller 100 also activates the standard camera 190 to start taking the standard through image in the step S21.

When the wide angle camera 180 starts taking the video in the step S21, the controller 100 causes the main screen 350 to display the video during shooting 410 in a step S22. The controller also causes the display screen 2a to display a switch button 340 in the step S22.

Figure 10:
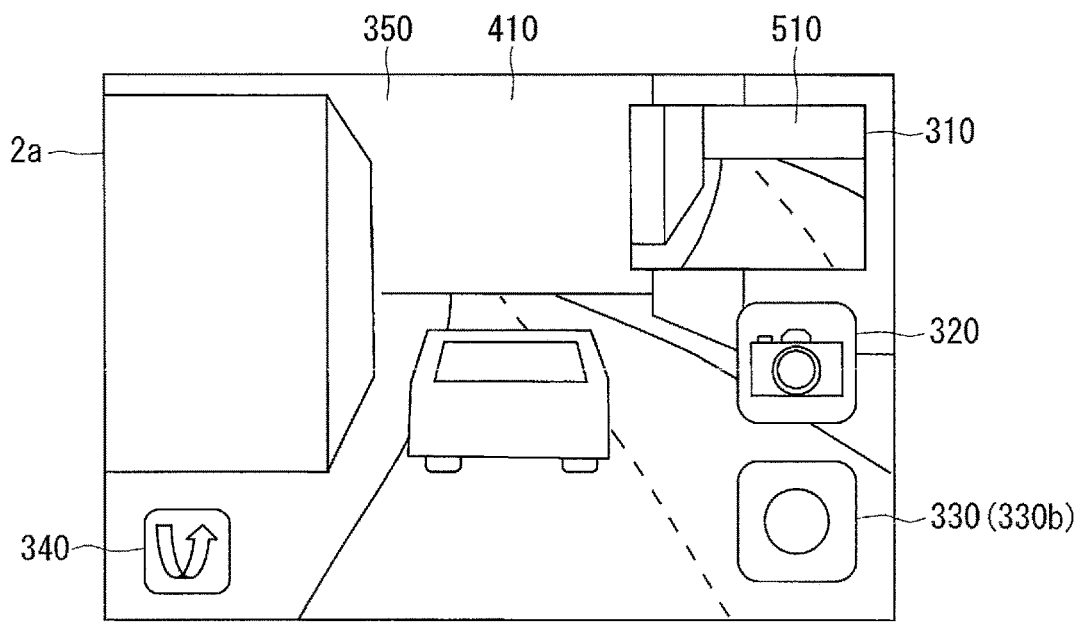
FIG. 10 illustrates an example of a display of the display screen.

FIG. 10 illustrates an example of the display screen 2a displaying the video during shooting 410 and the switch button 340. As shown in FIG. 10, the main screen 350 and the subscreen 310 display the video during shooting 410 and the shooting still image 510, respectively. The display screen 2a displays the switch button 340, which is a software button. In the example of FIG. 10, a lower left portion of the display screen 2a displays the switch button 340. The switch button 340 is an operation button for switching the images displayed on the main screen 350 and the subscreen 310, respectively.

After the step S22, when the touch panel 130 detects the operation on the switch button 340 in a step S23, the controller 100 causes the display panel 121 to display the standard through image 500 in a step S24.

Figure 11:
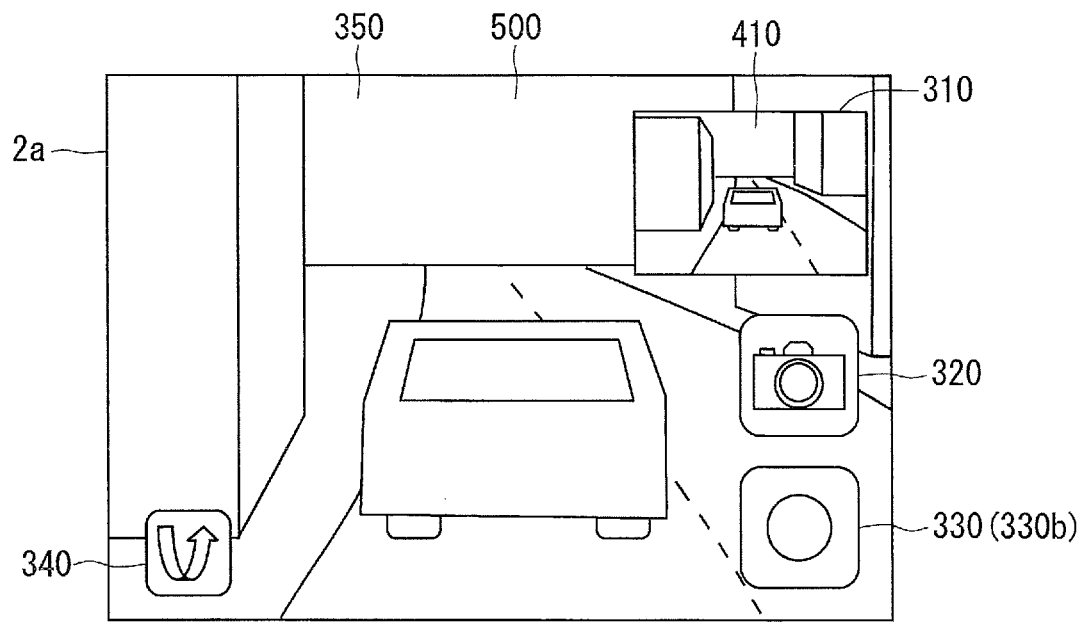
FIG. 11 illustrates an example of a display of the display screen.

FIG. 11 illustrates an example of a display of the display screen 2a displaying the standard through image 500 and the switch button 340. As shown in FIG. 11, the main screen 350 displays the standard through image 500 instead of the video during shooting 410. That is to say, the main screen 350 displays an object, which is sequentially taken with the standard camera 190, in a standard shooting range. The subscreen 310 displays the video during shooting 410 instead of the shooting still image 510.

When the touch panel 130 detects the operation on the switch button 340 in the state where the main screen 350 displays the standard through image 500 in a step S25, the step S22 is executed again. In the step S22 executed after the step S25, the controller 100 causes the main screen 350 to display the video during shooting 410 instead of the standard through image 500. Moreover, the controller 100 causes the subscreen 310 to display the shooting still image 510 instead of the video during shooting 410. Accordingly, the display screen 2a displays a screen shown in FIG. 10.

Since the display screen 2a displays the standard through image 500 as described above, the user can confirm the standard through image 500. Moreover, the main screen 350 displays the standard through image 500 and the subscreen 310 displays the video during shooting 410, so that the user can confirm the standard through image 500 and the video during shooting 410 at the same time. Since the standard through image 500 is displayed in larger size than the video during shooting 410, the user can easily confirm the standard through image 500.

Figure 12:
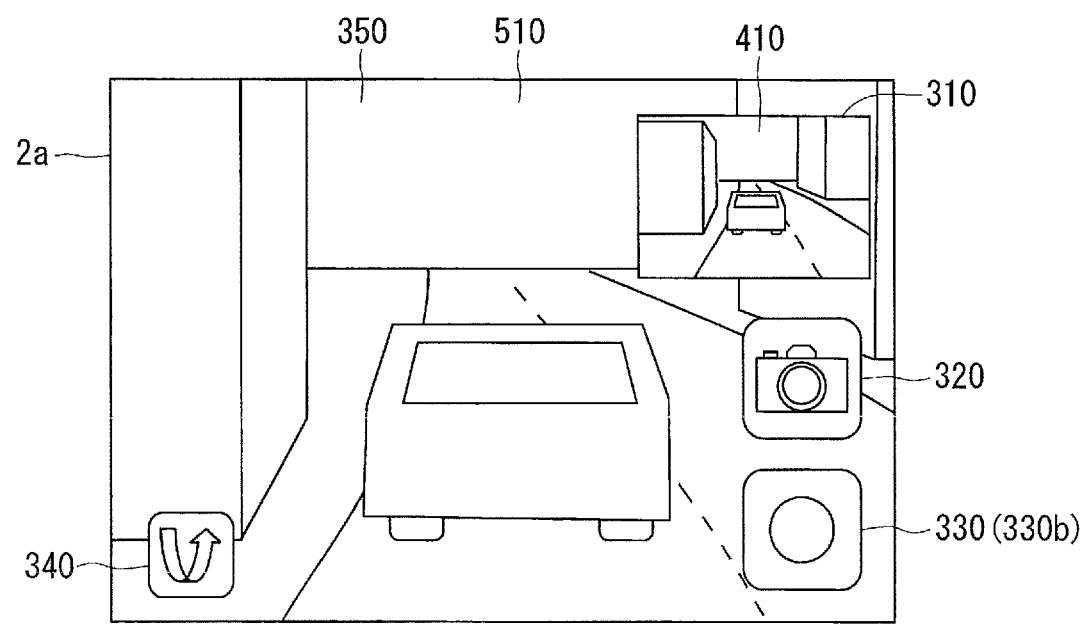
FIG. 12 illustrates an example of a display of the display screen.

When the standard camera 190 takes the still image in the state where the main screen 350 displays the standard through image 500 and the subscreen 310 displays the video during shooting 410, the controller 100 causes the main screen 350 to display the shooting still image 510, for example, as shown in FIG. 12. After the controller 100 causes the main screen 350 to display the shooting still image 510 for a predetermined period of time, the controller 100 causes the main screen 350 to display the standard through image 500 as shown in FIG. 11. Alternatively, when the standard camera 190 takes the still image in the state where the main screen 350 displays the standard through image 500 and the subscreen 310 displays the video during shooting 410, the controller 100 may cause the main screen 350 to display the video during shooting 410 and cause the subscreen 310 to display the shooting still image 510, as shown in FIG. 10.

When the touch panel 130 detects the operation on the video shooting button 330 in the state where the main screen 350 displays the standard through image 500 and the subscreen 310 displays the video during shooting 410, the controller 100 stops taking the video with the wide angle camera 180. When the wide angle camera 180 stops taking the video, the subscreen 310 displays the wide angle through image 400 instead of the video during shooting 410 as shown in FIG. 13.

The switch button 340 may also be displayed when the main screen 350 displays not only the video during shooting 410 but also the wide angle through image 400. In this case, when the main screen 350 displays the wide angle through image 400, the standard camera 190 is operated.

Figure 14:
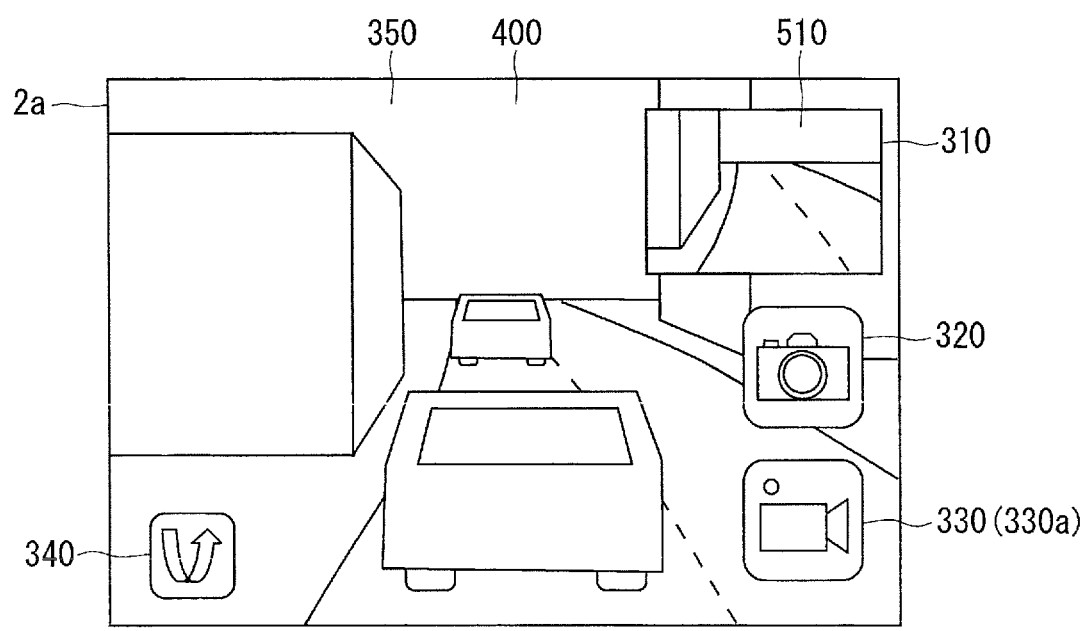
FIG. 14 illustrates an example of a display of the display screen.

FIG. 14 illustrates an example of a display of the display screen 2a displaying the wide angle through image 400 and the switch button 340. As shown in FIG. 14, the main screen 350 and the subscreen 310 displays the wide angle through image 400 and the shooting still image 510, respectively. The lower left portion of the display screen 2a displays the switch button 340.

Figure 13:
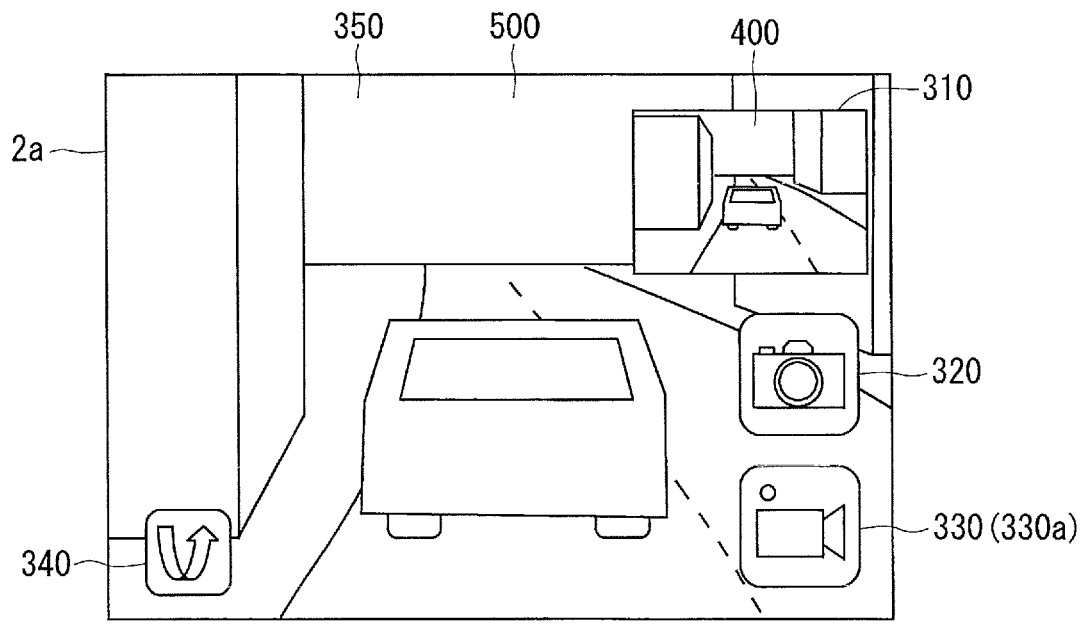
FIG. 13 illustrates an example of a display of the display screen.

When the touch panel 130 detects the operation on the switch button 340 in the state where the display screen 2a displays the screen as shown in FIG. 14, the main screen 350 displays the standard through image 500 instead of the wide angle through image 400 and the subscreen 310 displays the wide angle through image 400 instead of the shooting still image 510 as shown FIG. 13 described above. Subsequently, when the touch panel 130 detects the operation on the switch button 340, the main screen 350 displays the wide angle through image 400 instead of the standard through image 500 and the subscreen 310 displays the shooting still image 510 instead of the wide angle through image 400 as shown in FIG. 14.

When the touch panel 130 detects the operation on the video shooting button 330 in the state where the main screen 350 displays the standard through image 500 and the subscreen 310 displays the wide angle through image 400 (refer to FIG. 13), the controller 100 starts taking the video with the wide angle camera 180. When the wide angle camera 180 starts taking the video, the subscreen 310 displays the video during shooting 410 instead of the wide angle through image 400 as shown in FIG. 11 described above.

In the display screen 2a shown in FIGS. 10 and 14, the subscreen 310 may display not the shooting still image 510 but the standard through image 500 as shown in FIG. 8 described above.

<With Regard to Zoom Shooting>

As described above, the electronic apparatus 1 has a zoom function for each of the wide angle camera 180, standard camera 190, and in-camera 200.

A pinch-out operation (also referred to as the pinch-open operation), for example, is adoptable as a zoom-in operation for zooming in an object in a shooting range of a camera. A pinch-in operation (also referred to as the pinch-close operation), for example, is adoptable as a zoom-out operation for zooming out an object in a shooting range of a camera. The pinch-out operation and the pinch-in operation are collectively referred to as a pinch operation.

Figure 15:
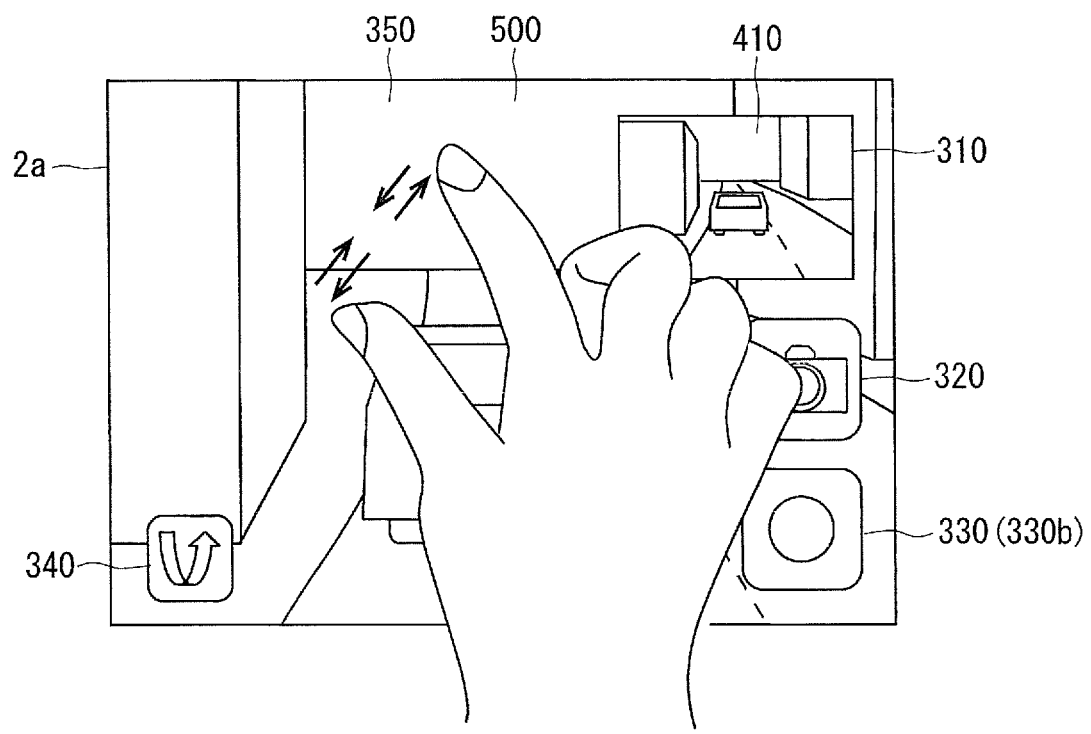
FIG. 15 illustrates an example of a user operation on the display screen.

FIG. 15 illustrates the pinch operation as a zoom operation on the main screen 350 displaying the standard through image 500 in the display screen 2a.

As shown in FIG. 15, the pinch-out operation indicates an operation of moving two fingers (for example, a thumb and an index finger) away from each other (opening the two fingers) in a state where the two fingers are in contact with or close to the display screen 2a. A zoom magnification in the zoom-in operation is determined by a distance between the two fingers moving away from each other (an angle between the two fingers which are being opened) in the pinch-out operation. The zoom magnification gets larger as the two fingers which perform the pinch-out operation move away from each other. Accordingly, the object in the shooting range of the standard camera 190 can be zoomed in.

As shown in FIG. 15, the pinch-in operation indicates an operation of approaching the two fingers each other (closing the two fingers) in the state where the two fingers are in contact with or close to the display screen 2a. A zoom magnification in the zoom-out operation is determined by a distance between the two fingers approaching each other (an angle between the two fingers which are being closed) in the pinch-in operation. The zoom magnification gets smaller as the two fingers which perform the pinch-in operation approach each other. Accordingly, the object in the shooting range of the standard camera 190 can be zoomed out.

In the above manner, when the main screen 350 of the display screen 2a displays the standard through image 500, the shooting range of the standard camera 190 can be zoomed. Accordingly, the user can cause the standard camera 190 of the electronic apparatus 1 to zoom and take the still image by operating the still image shooting button 320.

Figure 16:
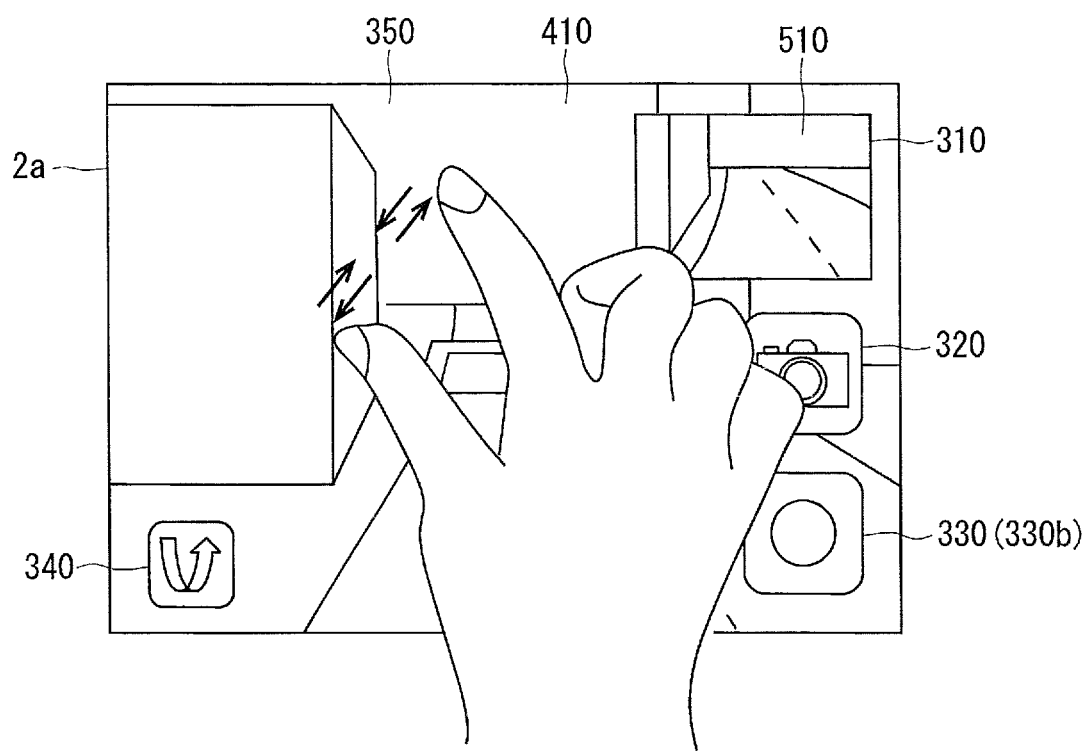
FIG. 16 illustrates an example of a user operation on the display screen.

The zoom operation achieved by the pinch operation can be performed on not only the standard camera 190 but also the wide angle camera 180. FIG. 16 illustrates the pinch operation as a zoom operation on the main screen 350 displaying the video during shooting 410 in the display screen 2a. The user can perform the pinch operation on the main screen 350 displaying the video during shooting 410 to change the field angle of the video taken with the wide angle camera 180. Accordingly, the zoom shooting of the video is performed. When the main screen 350 displays the wide angle through image 400, the user can perform the pinch operation on the main screen 350 displaying the wide angle through image 400 to perform the zoom operation on the wide angle camera 180. Accordingly, the user can operate the video shooting button 330 to cause the wide angle camera 180 of the electronic apparatus 1 to zoom and take the video.

When the pinch operation is performed on the main screen 350 in a state where both the wide angle camera 180 and the standard camera 190 are activated, only one of the wide angle camera 180 and standard camera 190, which takes the image displayed on the main screen 350, is zoomed, and the other camera is not zoomed, so that the shooting range of the other camera is maintained.

As described above, even when the wide angle camera 180 is taking the video, the user can perform the zoom operation on the standard camera by performing the pinch operation on the main screen 350 which displays the standard through image 500. That is to say, the user can cause the standard camera 190 to zoom the take the object even during taking the video with the wide angle camera 180.

Second Modification Example: Automatic Shooting of Still Image

In the present modification example, when the controller 100 determines that a first condition is established while the wide angle camera 180 takes the video, the standard camera

190 automatically takes the still image. The first condition in which the standard camera 190 automatically takes the still image is hereinafter referred to as the automatic shooting condition in some cases.

<Automatic Shooting when Electronic Apparatus is Located in Predetermined Position>

As the automatic shooting condition, a condition whether or not the electronic apparatus 1 is located in a predetermined position, for example, may be adopted. The electronic apparatus 1 which adopts such an automatic shooting condition is described hereinafter.

FIG. 17 illustrates a block diagram showing an example of the electrical configuration of the electronic apparatus 1 according to the present modification example. Provided with a location information acquisition unit 220 is the electronic apparatus 1 according to the present modification example.

The location information acquisition unit 220 can obtain a current position of the electronic apparatus 1. The location information acquisition unit 220 is a device using GPS (Global Positioning System), for example. The location information acquisition unit 220 can receive a GPS signal from a GPS satellite to require a location information indicating the current position of the electronic apparatus 1 based on the GPS signal. The location information includes a latitude information and a longitude information, for example.

Figure 18:
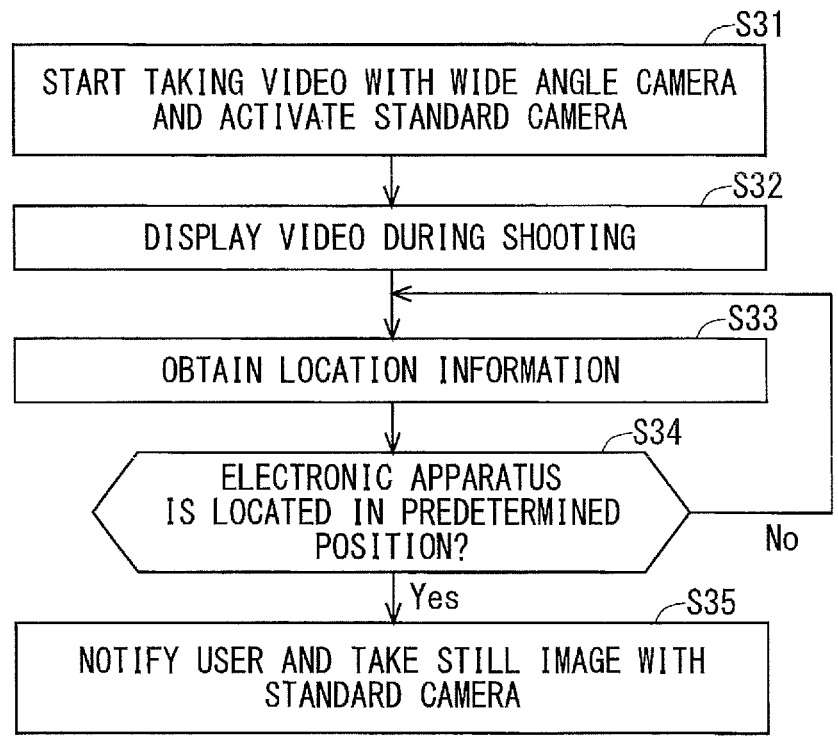
FIG. 18 illustrates a flow chart showing an example of an operation of the electronic apparatus.

FIG. 18 illustrates a flow chart showing an example of an operation of the electronic apparatus 1 according to the present modification example. When the video shooting button 330 is operated during the execution of the camera application, the controller 100 starts taking the video with the wide angle camera 180 and activates the standard camera 190 in a step S31. The controller 100 causes the main screen 350 to display the video during shooting 410 in a step S32.

After the step S32, the location information acquisition unit 220 obtains the location information indicating the current position of the electronic apparatus 1 in a step S33.

Next, in a step S34, the controller 100 determines whether or not the electronic apparatus 1 is located in the predetermined position based on the location information obtained in the step S33. The controller 100 serves as a determination unit to determine whether or not the electronic apparatus 1 is located in the predetermined position. The storage 103 stores the location information of a position to be a destination (also referred to as the destination information hereinafter in some cases). The controller 100 compares the location information and the destination information obtained from the location information acquisition unit 220, and when a distance between the current position of the electronic apparatus 1 and the position of the destination is within a predetermined distance, the controller 100 determines that the electronic apparatus 1 is located in the predetermined position (destination). In contrast, the controller 100 compares the location information and the destination information obtained from the location information acquisition unit 220, and when a distance between the current position of the electronic apparatus 1 and the position of the destination is longer than a predetermined distance, the controller 100 determines that the electronic apparatus 1 is not located in the predetermined position.

The user can instruct the electronic apparatus 1 to specify the destination (the predetermined position). The storage 103 stores, for example, a map application to display a map. When the user operates the display screen 2*a* to cause the electronic apparatus 1 to execute the map application, the display screen 2*a* displays the map. The user operates the map displayed on the display screen 2*a* so as to be able to instruct the electronic apparatus 1 to specify the destination. The electronic apparatus 1 generates the location information (the destination information) of the destination specified by the user to store the location information in the storage 103. The user can instruct the electronic apparatus 1 to specify the destination by inputting an address or a telephone number to the electronic apparatus 1. The electronic apparatus 1 generates the destination information in accordance with the input address or telephone number to store the destination information in the storage 103. The user can instruct the electronic apparatus 1 to specify the destination by selecting a name of a famous place, shop, building, or the like stored in the storage 103 using the display screen 2*a*. The electronic apparatus 1 generates the destination information in accordance with the selected name to store the destination information in the storage 103.

When it is determined that the electronic apparatus 1 is not located in the predetermined position in the step 34, the step S33 is executed again. That is to say, the step S33 and the step S34 are executed until it is determined that the electronic apparatus 1 is located in the predetermined position in the step 34. The above sequence of processings is executed every predetermined time, for example.

In the meanwhile, when it is determined that the electronic apparatus 1 is located in the predetermined position in the step S34, a step S35 is executed. In the step S35, the controller 100 causes the display panel 121 to display a first notice information to notify that the current position of the electronic apparatus 1 corresponds to the predetermined position. The controller 100 serves as a notification unit to notify that the current position of the electronic apparatus 1 corresponds to the predetermined position. The controller 100 also causes the standard camera 190 to take the still image in the step S35.

Figure 19:
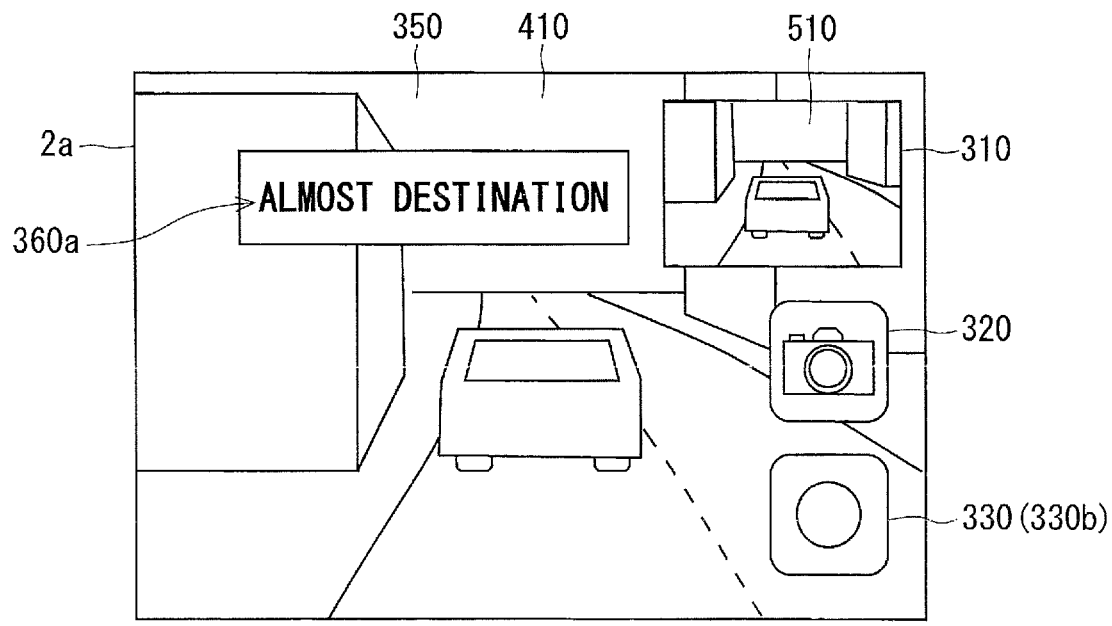
FIG. 19 illustrates an example of a display of the display screen.

FIG. 19 illustrates an example of the display screen 2*a* displaying the first notice information. In the example of FIG. 19, a character string 360*a* of "almost the destination" is displayed as the first notice information. The first notice information is displayed to overlap the video during shooting 410 on the main screen 350, for example.

Since the first notice information is displayed on the display screen 2*a* as described above, the user can recognize that the electronic apparatus 1 is located in the predetermined position.

When the controller 100 determines that the electronic apparatus 1 is located in the predetermined position while the wide angle camera 180 takes the video, the controller 100 takes the still image with the standard camera 190, so that the controller 100 can automatically take the still image.

In the above example, the standard camera 190 is activated when the wide angle camera 180 takes the video, however, it is also applicable to activate the standard camera 190 when it is determined that the electronic apparatus 1 is located in the predetermined position. Accordingly, the power consumption of the electronic apparatus 1 can be suppressed.

In the above, example, the display 120 which displays the first notice information serves as the notification unit to notify the user that the electronic apparatus 1 is located in the predetermined position, however, the notification unit may have other configuration. The notification unit may be made up of a speaker, for example, to notify the user that the electronic apparatus 1 is located in the predetermined position with sound. As the speaker, the external speaker 170 may be adopted, for example. The notification unit may be a light emitting unit to notify the user that the electronic apparatus 1 is located in the predetermined position with light. As the light emitting unit, a light emitting diode is adopted, for example. The notification unit may be a vibration unit to notify the user that the electronic apparatus 1 is located in the predetermined position with vibration. The vibration unit causes the cover panel 2 or the apparatus case 3 to vibrate, for example. As the vibration unit, an eccentric motor or a piezoelectric element is used, for example.

<Automatic Shooting when Standard Camera Catches Predetermined Object>

Figure 20:
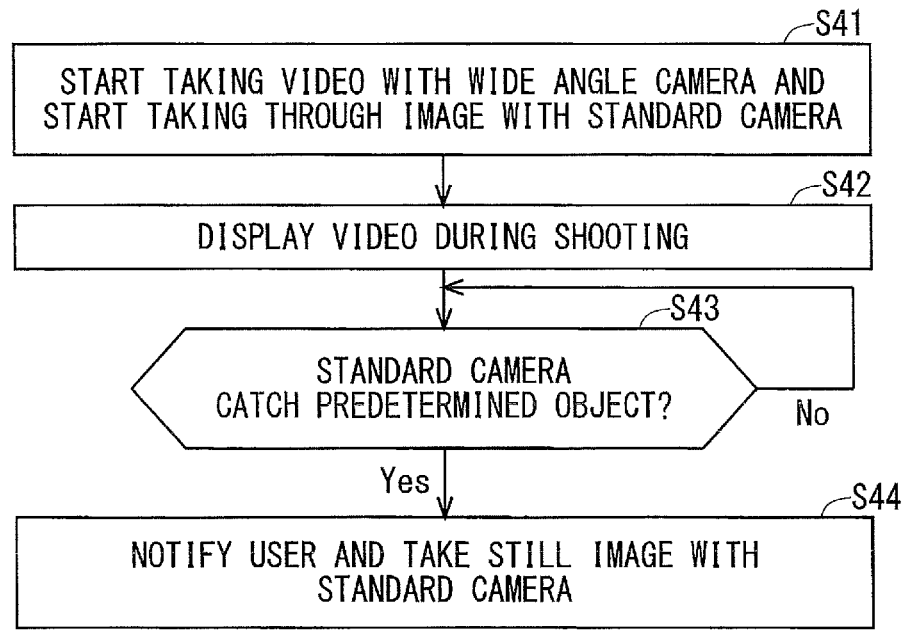
FIG. 20 illustrates a flow chart showing an example of an operation of the electronic apparatus.

The automatic shooting condition is not limited to the above example. As the automatic shooting condition, a condition whether or not the standard camera 190 catches a predetermined object, for example, may be adopted. An operation of the electronic apparatus 1 in a case where such an automatic shooting condition is adopted is described hereinafter. FIG. 20 illustrates a flow chart showing an example of the operation.

When the video shooting button 330 is operated during the execution of the camera application, the controller 100 starts taking the video with the wide angle camera 180 in a step S41. The controller 100 also activates the standard camera 190 to start taking the standard through image 500 in the step S41.

When the wide angle camera 180 starts taking the video in the step S41, the controller 100 causes the main screen 350 to display the video during shooting 410 in a step S42. The display screen 2a displays such a screen as shown in FIG. 6.

Next, in a step S43, the controller 100 determines whether or not the standard camera 190 catches the predetermined object. The controller 100 serves as a determination unit to determine whether or not the standard camera 190 catches the predetermined object. For example, the controller 100 determines whether or not the standard through image 500 includes a predetermined character string (a name of a shop, for example) using a character recognition technique. The controller 100 may also determine whether or not the standard through image 500 includes a predetermined object (a mark of a shop, for example) using an image recognition technique. The storage 103 stores information regarding the predetermined object such as the character string or the image, for example, via the input operation performed by the user.

When it is determined that the standard camera 190 does not catch the predetermined object in the step 43, the step S43 is executed again. That is to say, the step S43 is executed every predetermined time, for example, until it is determined that the standard camera 190 catches the predetermined object in the step 43.

In the meanwhile, when it is determined that the standard camera 190 catches the predetermined object in the step S43, a step S44 is executed. In the step S44, the controller 100 causes the display panel 121 to display a second notice information to notify that the standard camera 190 catches the predetermined object. The controller 100 serves as a notification unit to notify that the standard camera 190 catches the predetermined object. The controller 100 also causes the standard camera 190 to take the still image in the step S44.

Figure 21:
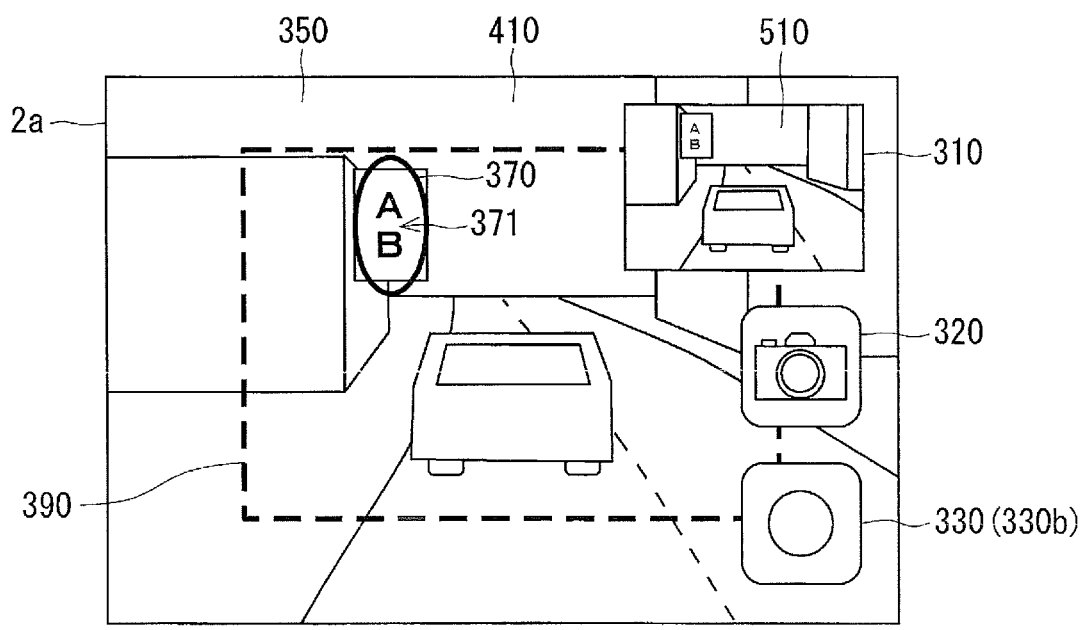
FIG. 21 illustrates an example of a display of the display screen.

FIG. 21 illustrates an example of the display screen 2a displaying the second notice information. In the example of FIG. 21, a character string 371 is determined to be the predetermined object, so that the display screen 2a displays a marker 370 and a marker 390 as the second notice information. The marker 370 is displayed so as to surround the predetermined object, thereby indicating a position of the predetermined object. The marker 390 indicates a region corresponding to the standard shooting range (a region including the object in the standard shooting range) in the video during shooting 410 displayed on the main screen 350. In FIG. 21, the subscreen 310 displays the shooting still image 510 which is automatically taken with the standard camera 190.

The markers 370 and 390 are not the information caught by the camera but the information displayed on the display screen 2a, so that the markers 370 and 390 are not included in the video during shooting 410, although displayed to overlap the video during shooting 410.

Since the second notice information is displayed on the display screen 2a as described above, the user can recognize that the standard camera 190 catches the predetermined object. Moreover, the marker 370 enables the user to recognize where the predetermined object is located in the video during shooting 410.

In the above example, the display 120 which displays the second notice information serves as the notification unit to notify the user that the standard camera 190 catches the predetermined object, however, the notification unit may have other configuration. The notification unit may be made up of a speaker, for example, to notify the user that the standard camera 190 catches the predetermined object with sound. As the speaker, the external speaker 170 may be adopted, for example. The notification unit may be a light emitting unit to notify the user that the standard camera 190 catches the predetermined object with light. As the light emitting unit, a light emitting diode is adopted, for example. The notification unit may be a vibration unit to notify the user that the standard camera 190 catches the predetermined object with vibration. The vibration unit causes the cover panel 2 or the apparatus case 3 to vibrate, for example. As the vibration unit, an eccentric motor or a piezoelectric element is used, for example.

When the controller 100 determines that that the standard camera 190 catches the predetermined object while the wide angle camera 180 takes the video, the controller 100 takes the still image with the standard camera 190, so that the controller 100 can automatically take the still image. Since the display screen 2a displays the marker 390, the user can confirm the object included in the still image which is automatically taken.

It is determined whether or not the predetermined object is included in the standard through image 500 taken with the standard camera, which automatically takes the still image, so that the still image including the predetermined object can be obtained more reliably.

In the step S43, it may also be determined whether or not the predetermined object is included in a region corresponding to the standard shooting range (a region including the object in the standard shooting range) in the wide angle through image 400 taken with the wide angle camera 180. In this case, also, the still image including the predetermined object can be obtained more reliably.

When it is determined whether or not the predetermined object is included in the region corresponding to the standard shooting range (the region including the object in the standard shooting range) in the wide angle through image 400 taken with the wide angle camera 180, the standard camera 190 may be stopped when the automatic shooting is not performed. Accordingly, the power consumption of the electronic apparatus 1 can be suppressed.

In the steps S35 and S44, only one still image may be taken, or a plurality of still images may be taken sequentially. When the condition that the electronic apparatus 1 is located in the predetermined position is adopted as the automatic shooting condition, the standard camera 190 may automatically take only one still image when the electronic apparatus 1 is located in the predetermined position or may sequentially take the still images every predetermined time, for example, during a period after the electronic apparatus 1 is located in the predetermined position until the electronic apparatus 1 moves a certain distance from the predetermined position. When the condition that the standard camera 190 catches the predetermined object is adopted as the automatic shooting condition, the standard camera 190 may take only one still image when the standard through image 510 includes the predetermined object or may sequentially take the still images every predetermined time, for example, during a period when the standard through image 510 includes the predetermined object.

When the plurality of still images are automatically taken sequentially, the display screen 2a displays the marker 370 and the marker 390 from the start to finish of the automatic shooting. Accordingly, the user can recognize that the plurality of still images are automatically taken sequentially. The marker 390 enables the user to recognize the shooting range of the automatic shooting.

Figure 22:
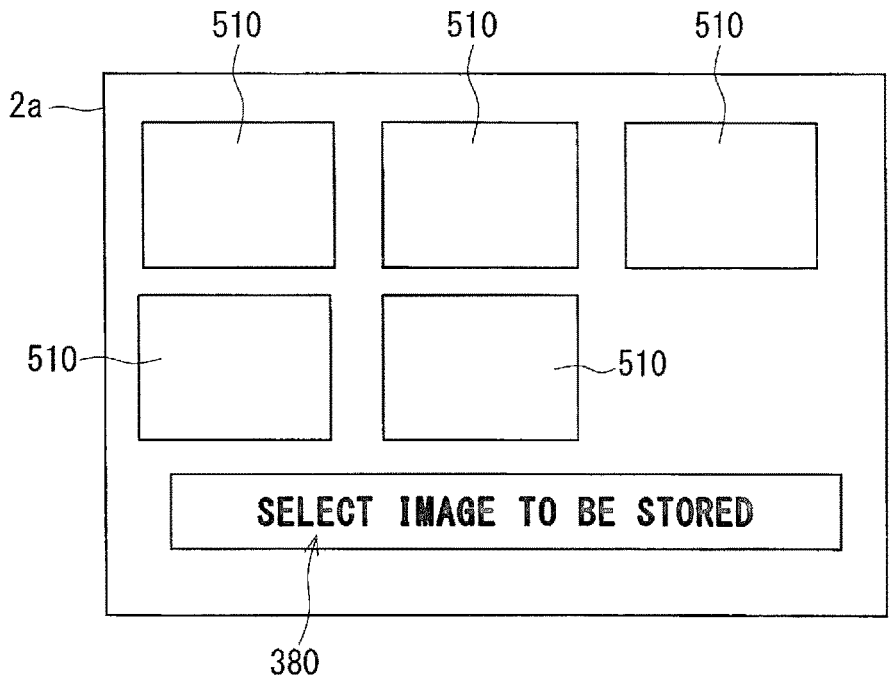
FIG. 22 illustrates an example of a display of the display screen.

When the plurality of still images are automatically taken sequentially, it is also applicable that the user can select, after the automatic shooting, an image to be stored from the plurality of still images which are automatically taken sequentially. In this case, a screen as shown in FIG. 22 is displayed, for example, after the plurality of still images are automatically taken sequentially. FIG. 22 illustrates an example of the display of the display screen 2a displaying the plurality of still images which are automatically taken sequentially. As shown in FIG. 22, the display screen 2a displays the plurality of the shooting still images 510 which are automatically taken. In the example of FIG. 22, a character string 380 of "select image to be stored" is displayed. The user can select the shooting still image which the user desires to store from the plurality of shooting still images via the tap operation, for example. The non-volatile memory 103b stores the shooting still image selected by the user.

In the above example, both the automatic shooting and the notification to the user are performed when the automatic shooting condition is established, however, only either one may be performed.

In the above example, described are the condition that the electronic apparatus 1 is located in the predetermined position and the condition that the standard camera 190 catches the predetermined object, however, the automatic shooting condition is not limited to the above example. For example, a condition satisfying both of the states where the electronic apparatus 1 is located in a predetermined position and the standard camera 190 catches the predetermined object may be adopted.

When the electronic apparatus 1 has an acceleration sensor, the automatic shooting may be performed when an acceleration detected by the acceleration sensor exceeds a predetermined value. Accordingly, when the electronic apparatus 1 is mounted on a car, the still image is automatically taken in a sudden braking, sudden starting, or collision of the car. Such an electronic apparatus 1 mounted on the car can be used as a drive recorder.

When the automatic shooting is not performed, the user can cause the electronic apparatus 1 to take the still image by operating the still image shooting button 320.

Third Modification Example: Switching Between Shooting Allowed Mode and No Shooting Allowed Mode In the present modification example, the electronic apparatus 1 includes, as an operation mode, the shooting allowed mode in which the standard camera 190 can take the still image while the wide angle camera 180 takes the video and the no shooting allowed mode in which the standard camera 190 does not take the still image while the wide angle camera 180 takes the video.

When the controller 100 determines that a second condition is established while the wide angle camera 180 takes the video, the operation mode of the electronic apparatus 1 is set to the shooting allowed mode, and when the controller 100 determines that the second condition is not established, the operation mode of the electronic apparatus 1 is set to the no shooting allowed mode. The second condition is hereinafter referred to as the shooting allowed condition in some cases.

As the shooting allowed condition, a condition whether or not the electronic apparatus 1 stays in a certain position, for example, is adopted. An operation of the electronic apparatus 1 in a state where such a shooting allowed condition is adopted is described hereinafter.

Figure 23:
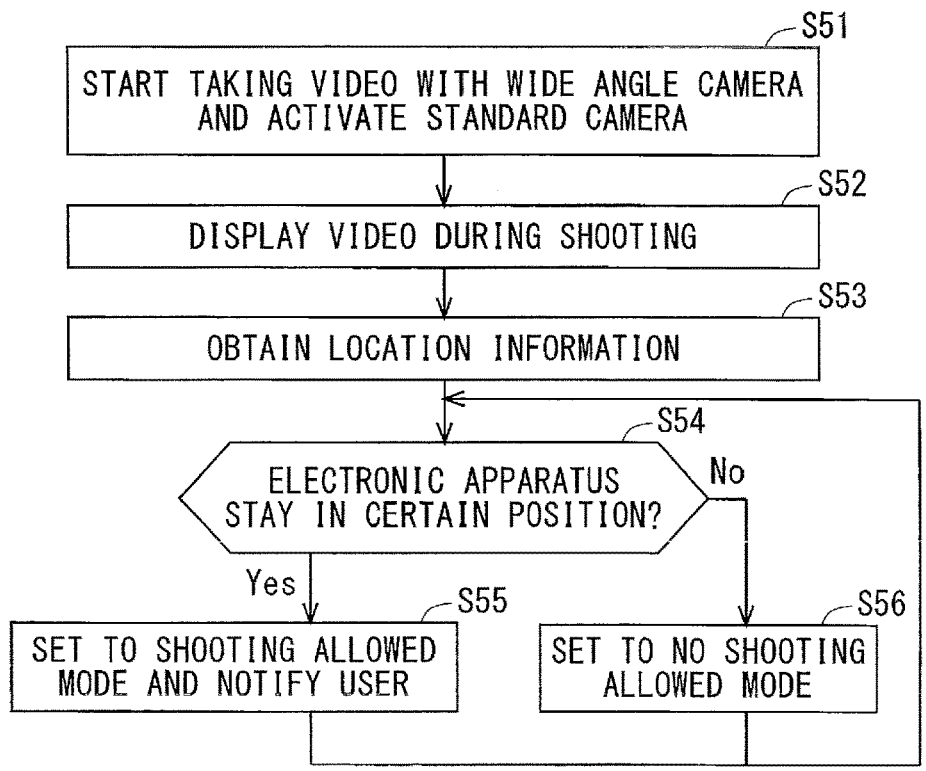
FIG. 23 illustrates a flow chart showing an example of an operation of the electronic apparatus.

FIG. 23 illustrates a flow chart showing an example of the operation. As shown in FIG. 23, when the video shooting button 330 is operated during the execution of the camera application, the controller 100 starts taking the video with the wide angle camera 180 in a step S51. The controller 100 also activates the standard camera 190 in the step S51.

When the wide angle camera 180 starts taking the video in the step S51, the controller 100 causes the main screen 350 to display the video during shooting 410 in a step S52. The display screen 2a displays such a screen as shown in FIG. 6.

After the step S52, the location information acquisition unit 220 obtains the location information indicating the current position of the electronic apparatus 1 in a step S53. Subsequently, in a step S54, the controller 100 determines whether or not the electronic apparatus 1 stays in the certain position based on the location information obtained in the step S53. The controller 100 serves as a determination unit to determine whether or not the electronic apparatus 1 stays in the certain position. The storage 103 stores the location information, which the location information acquisition unit 220 obtains every predetermined time, for a certain period of time. When the location information is input from the location information acquisition unit 220, the controller 100 determines whether or not each previous position of the electronic apparatus 1 in a certain period of time is located in a predetermined range based on the location information stored in the storage 103. When each position of the electronic apparatus 1 in the certain period of time is located in the predetermined range, the controller 100 determines that the electronic apparatus 1 stays in the certain position. Meanwhile, when the position of the electronic apparatus 1 has not been located in the predetermined range for the certain period of time, the controller 100 determines that the electronic apparatus 1 does not stay in the certain position.

When it is determined that the electronic apparatus 1 does not stay in the certain position in the step S54, the controller 100 sets the operation mode of the electronic apparatus 1 to the no shooting allowed mode in a step S56. Meanwhile, when it is determined that the electronic apparatus 1 stays in the certain position in the step S54, the controller 100 sets the operation mode of the electronic apparatus 1 to the shooting allowed mode in a step S55. In the step S55, the controller 100 also causes the display screen 2a to display a third notice information to notify that the operation mode of the electronic apparatus 1 is set to the shooting allowed mode.

Figure 24:
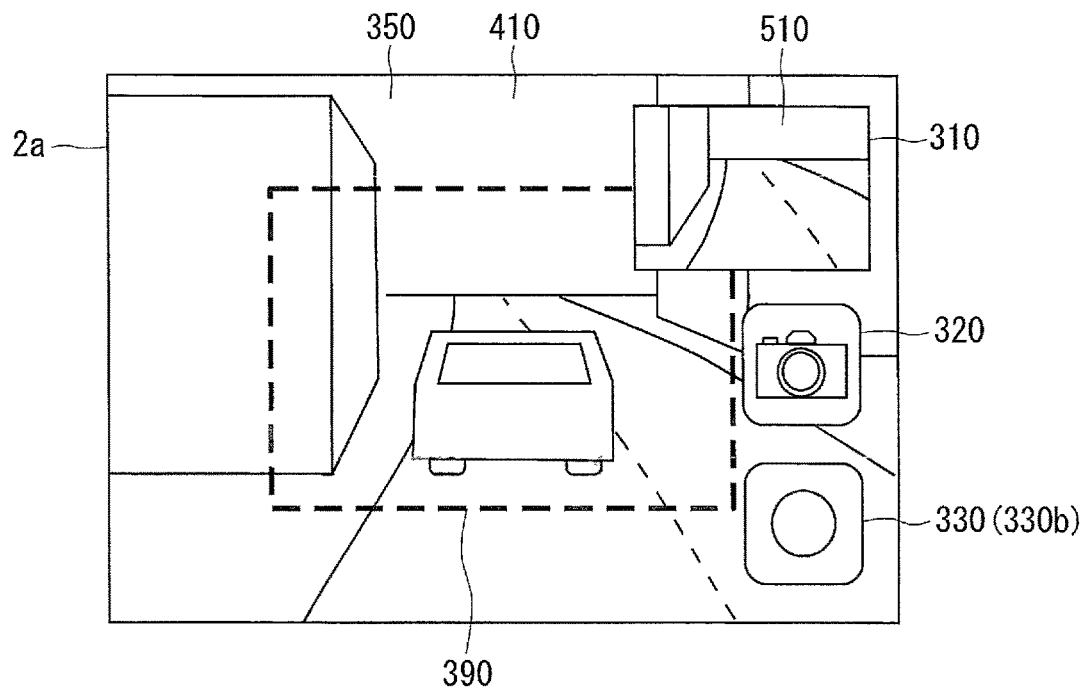
FIG. 24 illustrates an example of a display of the display screen.

FIG. 24 illustrates an example of the display screen 2a displaying the third notice information. The example of FIG. 24 shows the marker 390 indicating the standard shooting range as the third notice information.

As described above, when the operation mode of the electronic apparatus 1 is set to the shooting allowed mode, the display screen 2a displays the third notice information, so that the user can easily recognize whether the operation mode of the electronic apparatus 1 is set to the shooting allowed mode or the no shooting allowed mode.

FIG. 24 shows the display screen 2a when the zoom magnification of each of the wide angle camera 180 and standard camera 190 is "one". When the zoom magnification of the standard camera 190 does not change but the zoom magnification of the wide angle camera 180 is raised, a difference of a field angle between the standard shooting range and the wide angle shooting range is reduced. Accordingly, as the zoom magnification of the wide angle camera 180 is raised, the marker 390 indicating the standard shooting range is located more outwardly in the display screen 2a.

Figure 25:
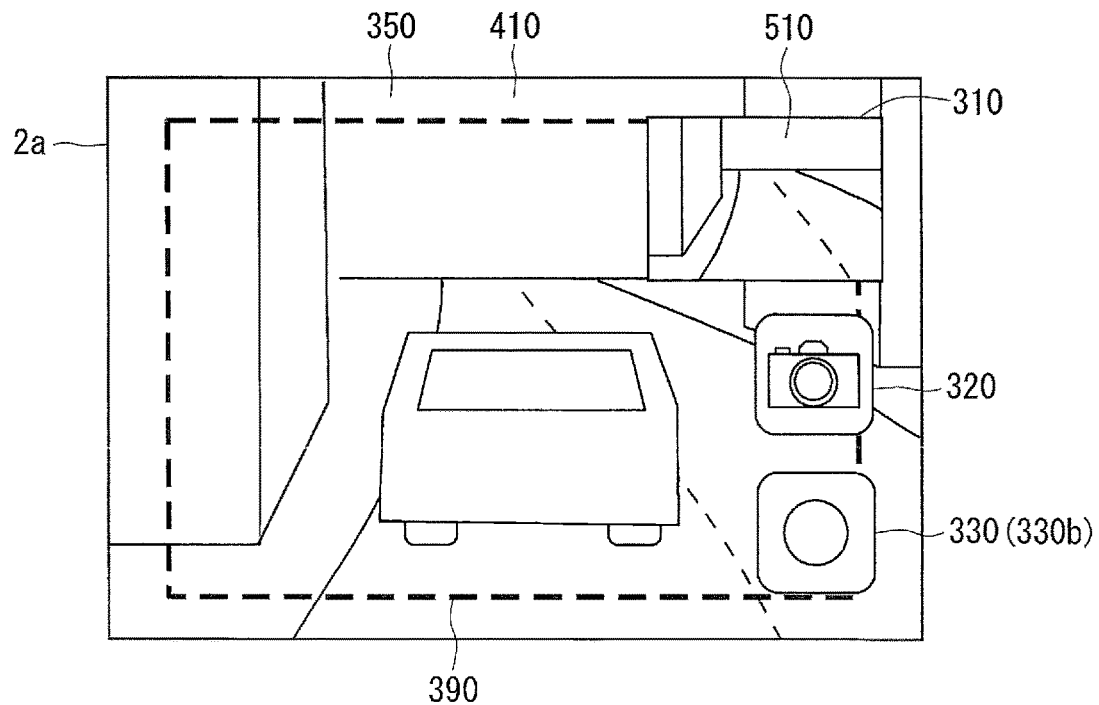
FIG. 25 illustrates an example of a display of the display screen.

FIG. 25 illustrates an example of the display screen 2a displaying the third notice information 390 when the zoom magnification of the standard camera 190 is "one" and the zoom magnification of the wide angle camera 180 is higher than "one". As shown in FIG. 25, the marker 390 is located more outwardly in the display screen 2 than that in the display screen 2a shown in FIG. 24.

When the zoom magnification of the wide angle camera 180 is raised, the wide angle shooting range may be narrower than the standard shooting range. In this case, the standard shooting range is wider than the field angle of the video during shooting 410 displayed on the display screen 2a, so that the display screen 2a cannot display the marker 390. Accordingly, when the marker 390 indicating the standard shooting range is adopted as the third notice information, the zoom magnification of the wide angle camera 180 may be limited so that the wide angle shooting range is not narrower than the standard shooting range.

The controller 100 may stop the standard camera 190 when the operation mode of the electronic apparatus 1 is set to the no shooting allowed mode. Accordingly, the power consumption of the electronic apparatus 1 can be suppressed compared to the case where the standard camera 190 is always activated when the wide angle camera 180 takes the video.

As described above, when the controller 100 determines that the shooting allowed condition is not established while the wide angle camera 180 takes the video, the operation mode of the electronic apparatus 1 is set to the no shooting allowed mode. Accordingly, the standard camera 190 does not take the still image when the wide angle camera 180 takes the video, so that the power consumption of the electronic apparatus 1 can be suppressed.

In the present example, when the controller 100 does not determine that the electronic apparatus 1 stays in the certain position, the operation mode of the electronic apparatus 1 is set to the no shooting allowed mode. Accordingly, the instruction for taking the still image (for example, a predetermined operation on the display screen 2a) provided by the user, who has the electronic apparatus 1, to the electronic apparatus 1 can be suppressed when he/she moves. When the electronic apparatus 1 is mounted on a vehicle or the like driven by the user, the instruction for taking the still image provided by the user, who drives the vehicle, to the electronic apparatus 1 can be suppressed.

When the operation mode of the electronic apparatus 1 is set to the shooting allowed mode, the display screen 2a displays the third notice information, so that the user can easily recognize whether the operation mode of the electronic apparatus 1 is set to the shooting allowed mode or the no shooting allowed mode.

In the above example, the display 120 which displays the third notice information serves as the notification unit to notify the user of the current operation mode of the electronic apparatus 1, however, the notification unit may have other configuration. The notification unit may be made up of a speaker, for example, to notify the user of the current operation mode of the electronic apparatus 1 with sound. As the speaker, the external speaker 170 may be adopted, for example. The notification unit may be a light emitting unit to notify the user of the current operation mode of the electronic apparatus 1 with light. As the light emitting unit, a light emitting diode is adopted, for example. The notification unit may be a vibration unit to notify the user of the current operation mode of the electronic apparatus 1 with vibration. The vibration unit causes the cover panel 2 or the apparatus case 3 to vibrate, for example. As the vibration unit, an eccentric motor or a piezoelectric element is used, for example.

Another Modification Example

Although the wide angle camera 180 and the standard camera 190 are mounted on one electronic apparatus in the above examples, they may be mounted on separate electronic apparatuses. For example, it is also applicable that the standard camera 190 is mounted on the above electronic apparatus 1 (mobile phone) and the wide angle camera 180 is mounted on a drive recorder. In this case, the electronic apparatus 1 and the drive recorder can mutually communicate with each other. The electronic apparatus 1 and the drive recorder are mounted inside the car so that the wide angle shooting range surrounds the standard shooting range in the state where the zoom magnification of each of the wide angle camera 180 and standard camera 190 is "one". When the wide angle camera 180 mounted on the drive recorder takes the video of a view in a traveling direction of the car, the standard camera 190 mounted on the electronic apparatus 1 takes the still image of the view in the traveling direction of the car. The wide angle through image 400 and the video during shooting 410 taken with the wide angle camera 180 of the drive recorder are transmitted to the electronic apparatus 1 wirelessly or with a wire, so that the electronic apparatus 1 can display the screen of the above FIGS. 5, 6, and so on in the same manner as the above. The electronic apparatus 1 controls the wide angle camera 180 of the drive recorder in accordance with the instruction from the user, for example, thereby controlling the start or finish of the video taken with the wide angle camera 180 or controlling the wide angle shooting range in the same manner as the above.

In the above examples, the wide angle camera 180 takes the video, however, the standard camera 190 may take the video. For example, the display screen 2a displaying the through image displays a camera switch button for switching the camera which takes the video, and the user operates the camera switch button, thereby enabling the electronic apparatus 1 to switch between the wide angle camera 180 and the standard camera 190 as the camera which takes the video.

When the standard camera 190 is used for taking the video, the wide angle camera 180 may be used for taking the still image. In this case, the wide angle camera 180 can take the still image during taking the video with the standard camera 190.

The first camera 180 is the camera which can take the image at the wider angle than the second camera 190, however, it is also applicable that the second camera 190 is the camera which can take the image at the wider angle than the first camera 180. The field angle of the first camera 180 may be the same as that of the second camera 190.

Although the examples above have been given of the case where the technique of the present disclosure is applied to a mobile phone such as a smartphone, the technique of the present disclosure is also applicable to another electronic apparatuses provided with a plurality of cameras. The technique of the present disclosure is also applicable to the electronic apparatus such as a digital camera, a personal computer, or a tablet terminal.

As described above, the electronic apparatus 1 has been described in detail, but the above-mentioned description is illustrative in all aspects and the present disclosure is not intended to be limited thereto. The above modifications may be applied in combination in so far as they are mutually consistent. Various modifications not exemplified are construed to be made without departing from the scope of the present invention.

The invention claimed is:

1. A portable electronic apparatus comprising:
   a housing;
   a first camera contained in the housing; and
   a second camera contained in the housing, wherein the second camera takes a still image while the first camera takes a video; and
   at least one processor configured to determine whether or not the portable electronic apparatus is located in a predetermined position while the first camera takes a video, wherein the portable electronic apparatus is configured to be carried by a user while the first camera takes the video, and
   wherein the second camera automatically takes a still image in response to the at least one processor determining that the electronic apparatus is located in the predetermined position while the first camera takes a video.

2. The portable electronic apparatus according to claim 1, wherein the electronic apparatus comprises a display, and the second camera takes a still image when the display displays a video during shooting, which is a video being taken with the first camera.

3. The portable electronic apparatus according to claim 2, wherein the electronic apparatus comprises an operation detector configured to detect an operation on a display screen of the display, and
   the display displays a through image taken with the second camera when the operation detector detects a first predetermined operation in a state where the display displays the video during shooting.

4. The portable electronic apparatus according to claim 3, wherein when the operation detector detects a second predetermined operation on the through image displayed by the display, the second camera zooms a shooting range of the second camera.

5. The portable electronic apparatus according to claim 2, wherein the portable electronic apparatus comprises an operation detector configured to detect an operation on a display screen of the display, and
   the display displays a second through image taken with the second camera when the operation detector detects a first predetermined operation in a state where the display displays a first through image taken with the first camera.

6. The portable electronic apparatus according to claim 5, wherein the display displays the first and second through images when the operation detector detects the first predetermined operation in a state where the display displays the first through image.

7. The portable electronic apparatus according to claim 5, wherein when the operation detector detects a second predetermined operation on the second through image displayed by the display, the second camera zooms a shooting range of the second camera.

8. The portable electronic apparatus according to claim 1, further comprising a notification unit configured to notify a user when the at least one processor determines that the electronic apparatus is located in the predetermined position while the first camera takes a video.

9. The portable electronic apparatus according to claim 1, wherein
   the portable electronic apparatus has a shooting allowed mode, in which the second camera can take a still image, and a no shooting allowed mode, in which the second camera does not take a still image, as an operation mode,
   when the at least one processor does not determine that the portable electronic apparatus is located in the predetermined position while the first camera takes a video, the operation mode is set to the no shooting allowed mode, and
   when the at least one processor determines that the portable electronic apparatus is located in a predetermined position while the first camera takes a video, the operation mode is set to the shooting allowed mode.

10. The portable electronic apparatus according to claim 9, wherein the portable electronic apparatus comprises a notification unit configured to notify a user of the operation mode being currently used when the first camera takes a video.

11. The portable electronic apparatus according to claim 1, wherein the first camera is a camera which can take an image at a wider angle than the second camera, or the second camera is a camera which can take an image at a wider angle than the first camera.

12. The portable electronic apparatus according to claim 1, wherein a total number of pixels of the still image is larger than that of the video, or a total number of pixels of the video is larger than that of the still image.

* * * * *